United States Patent
Kawamura

(10) Patent No.: US 8,140,119 B2
(45) Date of Patent: Mar. 20, 2012

(54) STORAGE MEDIUM AND CONFLICT CONTROL METHOD

(75) Inventor: Hirofumi Kawamura, Chiba (JP)

(73) Assignee: Sony Corporation, Tokyo (JP)

( * ) Notice: Subject to any disclaimer, the term of this patent is extended or adjusted under 35 U.S.C. 154(b) by 514 days.

(21) Appl. No.: 12/346,124

(22) Filed: Dec. 30, 2008

(65) Prior Publication Data

US 2009/0191919 A1    Jul. 30, 2009

(30) Foreign Application Priority Data

Jan. 30, 2008  (JP) ................................. 2008-019688

(51) Int. Cl.
*H04M 1/00*    (2006.01)

(52) U.S. Cl. ...................................................... 455/558
(58) Field of Classification Search ................... 455/558
See application file for complete search history.

(56) References Cited

U.S. PATENT DOCUMENTS

2008/0076475 A1*  3/2008  Kim .............................. 455/558

FOREIGN PATENT DOCUMENTS

JP        2008-210301         9/2008

* cited by examiner

*Primary Examiner* — Lincoln Donovan
*Assistant Examiner* — Daniel Rojas
(74) *Attorney, Agent, or Firm* — Oblon, Spivak, McClelland, Maier & Neustadt, L.L.P.

(57) ABSTRACT

Disclosed herein is a storage medium to be attached to a mobile phone for use, the storage medium including: a contact type connection section configured to connect with the mobile phone; a wireless communication section configured to connect with a controller located outside; a subscriber information storage section configured to store subscriber information about a subscriber using the mobile phone; and a conflict control section configured to control access to the subscriber information storage section by the mobile phone through the contact type connection section, and access to the subscriber information storage section by the controller through the wireless communication section.

17 Claims, 15 Drawing Sheets

| STATE / EVENT | INITIAL STATE | STATE OF OCCUPANCY BY MOBILE SIDE | STATE OF OCCUPANCY BY WIRELESS SIDE | WIRELESS ACCESS INTERRUPTED STATE |
|---|---|---|---|---|
| DEV_CLK DETECTED BEING STARTED | (1) TRANSITION TO THE STATE OF OCCUPANCY BY MOBILE SIDE | | (1) TRANSITION TO THE WIRELESS ACCESS INTERRUPTED STATE | |
| MOBILE-SIDE COMMAND RECEIVED (STATUS COMMAND) | | (1)MOBILE-SIDE COMMAND CONTROL SEQUENCE EXECUTED | | (1)STATUS RESPONSE TRANSMITTED -RETAINED IN-DATA AND STATUS BYTE TRANSMITTED (2)TRANSITION TO THE STATE OF OCCUPANCY BY WIRELESS SIDE |
| MOBILE-SIDE COMMAND RECEIVED (EXCEPT FOR STATUS COMMAND) | | (1)MOBILE-SIDE COMMAND CONTROL SEQUENCE EXECUTED - MOBILE-SIDE FILE ID RETAINED WHEN SELECT COMMAND IS IN EFFECT - IN-DATA AND STATUS BYTE RETAINED FROM THE IMMEDIATELY FOLLOWING GET RESPONSE COMMAND | | (1)HEADER RETAINED (2) NULL BYTE OUTPUT TO MOBILE SIDE. (3) MOBILE ACCESS RETURN PROCESSING - MOBILE-SIDE FILE ID RETURNED - RETAINED HEADER OUTPUT (4) TRANSITION TO THE STATE OF OCCUPANCY BY MOBILE SIDE |
| DEV_CLK DETECTED BEING STOPPED | | TRANSITION TO INITIAL STATE | | |
| WIRELESS-SIDE COMMAND RECEIVED | (1)WIRELESS-SIDE FILE ID RETURN PROCESSING (2) TRANSITION TO THE STATE OF OCCUPANCY BY WIRELESS SIDE | (1) RESPONSE FRAME TRANSMITTED - NOTTIFICATION OF CONTINUED OCCUPANCY BY MOBILE SIDE | (1)WIRELESS-SIDE COMMAND CONTROL SEQUENCE EXECUTED  - FILE ID RETAINED WHEN SELECT COMMAND IS IN EFFECT | (1) RESPONSE FRAME TRANSMITTED - NOTTIFICATION OF INTERRUPTED WIRELESS ACCESS |

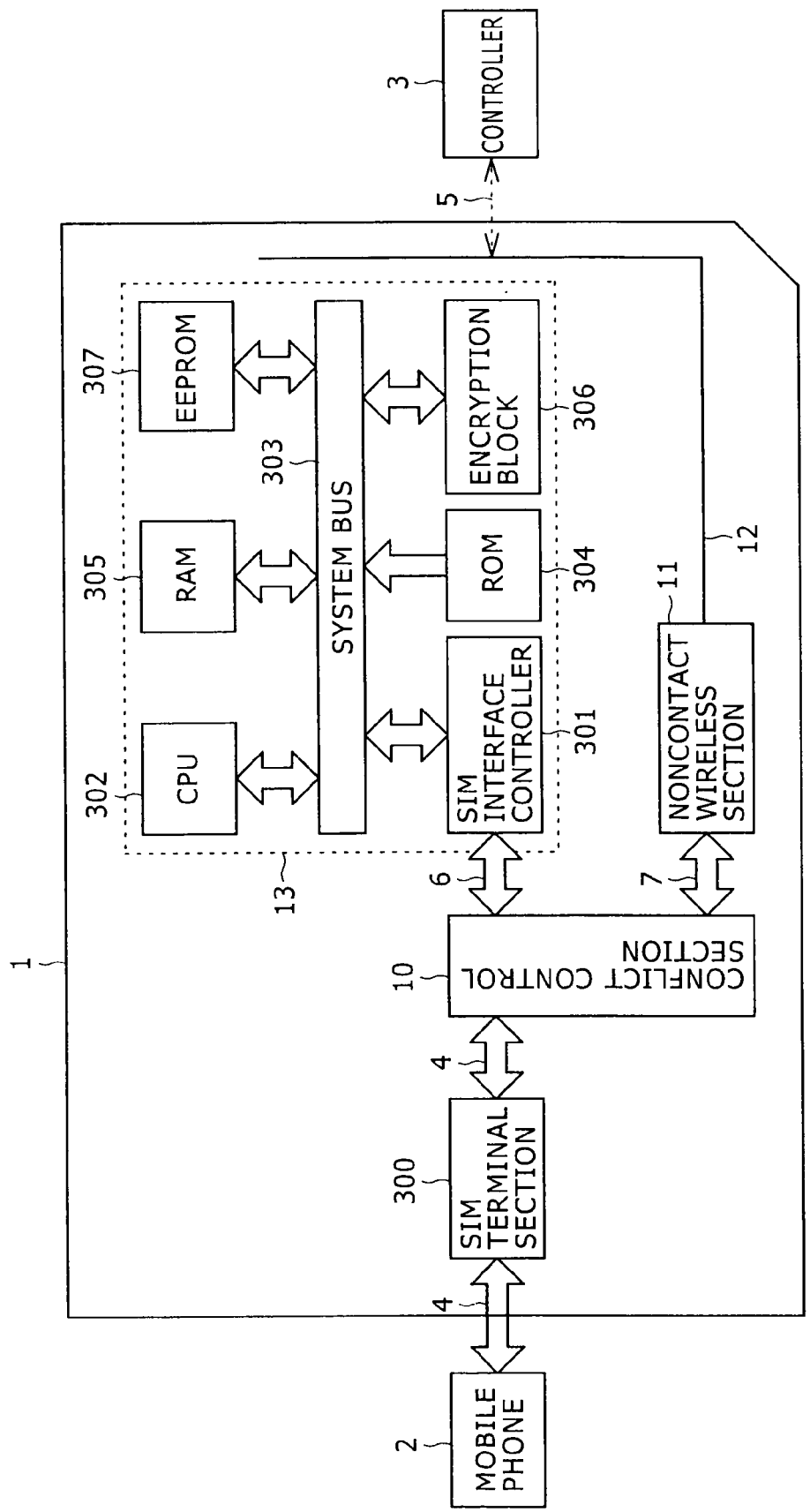

FIG. 15

| EVENT \ STATE | INITIAL STATE | STATE OF OCCUPANCY BY MOBILE SIDE | STATE OF OCCUPANCY BY WIRELESS SIDE | WIRELESS ACCESS INTERRUPTED STATE |
|---|---|---|---|---|
| DEV_CLK DETECTED BEING STARTED | (1) TRANSITION TO THE STATE OF OCCUPANCY BY MOBILE SIDE | | (1) TRANSITION TO THE WIRELESS ACCESS INTERRUPTED STATE | |
| MOBILE-SIDE COMMAND RECEIVED (STATUS COMMAND) | | (1) MOBILE-SIDE COMMAND CONTROL SEQUENCE EXECUTED | | (1) STATUS RESPONSE TRANSMITTED - RETAINED IN-DATA AND STATUS BYTE TRANSMITTED (2) TRANSITION TO THE STATE OF OCCUPANCY BY WIRELESS SIDE |
| MOBILE-SIDE COMMAND RECEIVED (EXCEPT FOR STATUS COMMAND) | | (1) MOBILE-SIDE COMMAND CONTROL SEQUENCE EXECUTED - MOBILE-SIDE FILE ID RETAINED WHEN SELECT COMMAND IS IN EFFECT - IN-DATA AND STATUS BYTE RETAINED FROM THE IMMEDIATELY FOLLOWING GET RESPONSE COMMAND | | (1) HEADER RETAINED (2) NULL BYTE OUTPUT TO MOBILE SIDE (3) MOBILE ACCESS RETURN PROCESSING - MOBILE-SIDE FILE ID RETURNED - RETAINED HEADER OUTPUT (4) TRANSITION TO THE STATE OF OCCUPANCY BY MOBILE SIDE |
| DEV_CLK DETECTED BEING STOPPED | | TRANSITION TO INITIAL STATE | | |
| WIRELESS-SIDE COMMAND RECEIVED | (1) WIRELESS-SIDE FILE ID RETURN PROCESSING (2) TRANSITION TO THE STATE OF OCCUPANCY BY WIRELESS SIDE | (1) RESPONSE FRAME TRANSMITTED - NOTIFICATION OF CONTINUED OCCUPANCY BY MOBILE SIDE | (1) WIRELESS-SIDE COMMAND CONTROL SEQUENCE EXECUTED - FILE ID RETAINED WHEN SELECT COMMAND IS IN EFFECT | (1) RESPONSE FRAME TRANSMITTED - NOTIFICATION OF INTERRUPTED WIRELESS ACCESS |

STORAGE MEDIUM AND CONFLICT CONTROL METHOD

CROSS REFERENCES TO RELATED APPLICATIONS

The present invention contains subject matter related to Japanese Patent Application JP 2008-019688 filed with the Japan Patent Office on Jan. 30, 2008, the entire contents of which being incorporated herein by reference.

BACKGROUND OF THE INVENTION

1. Field of the Invention

The present invention relates to a storage medium which stores information about the subscriber of a mobile phone, which includes a contact type interface connecting to the mobile phone, and which is furnished with SIM card functions defined by GSM (11.11) and ISO/IEC 7816.

2. Description of the Related Art

More particularly, the invention relates to a storage medium which has the size and terminal configuration defined by GSM (11.11) and ISO/IEC 7816; which provides a mobile phone with multiple capabilities including a memory card function, an electronic money function, and a credit card function; and which has a contact type mobile phone connection interface supplemented by a noncontact interface for allowing an external controller to control the data stored on the medium about service offerings such as the memory card function, electronic money function, and credit card function.

Against the background of rapid technological progress in data communication and widespread use of information processing equipment in recent years, common carriers have been reorganized, their price scales revised and their communication services diversified. Progress has been prominent particularly in mobile communication technologies such as mobile phones in the communication industry growing in leaps and bounds.

Generally, each mobile phone is furnished with a contact type IC (integrated circuit) card called a SIM (subscriber identity module) that stores information about the subscriber of the phone offered by a common carrier operating a mobile phone network. Many of today's mobile phones have noncontact IC card functions that support applications such as electronic money. There also exist a large number of mobile phones equipped with a slot for accommodating a memory card that stores images taken by camera and music data to be reproduced. What follows is a description of the background art regarding some of the card functions incorporated in the mobile phone.

SIM Card and IC Card

The SIM card is a contact type IC card defined by ISO/IEC 7816 and is used by mobile phones operating on the principles of GSM (Global System for Mobile Communications) and W-CDMA (Wideband-Code Division Multiple Access). Each SIM card is assigned its unique number called IMSI (International Mobile Subscriber Identity). A call can be placed when the mobile phone is operated to combine its IMSI with its telephone number.

In order to be incorporated in the mobile phone, a SIM card 1 (see FIG. 18B) is made smaller (measuring 15 mm by 25 mm by 0.76 mm) than an ordinary noncontact type IC card 1' (measuring 86 mm by 54 mm, see FIG. 18B) and has a specifically defined shape. The contact type IC card exchanges data with other equipment via a SIM terminal section 300 shaped as illustrated.

FIG. 19 schematically shows how the SIM card 1 is mounted on a mobile phone 2. Because the SIM card must not be powered when inserted or removed, many mobile phones are structured to have the SIM card mounted or dismounted only if the battery pack is detached so as to remove power securely. In FIG. 19, the SIM card 1 is shown mounted behind a battery pack 21 at the back of the mobile phone 2.

Changing the SIM card from one mobile phone to another can transport the telephone number between phones. Changing SIM cards by turns on a single mobile phone allows the phone to utilize a plurality of telephone numbers. Basically, however, the SIM card is not supposed to be inserted or removed frequently. The largest SIM card capacity in practice today is about 128 MB, large enough to store personal information about the subscriber and a telephone directory carrying tens of telephone numbers and related information. Some manufacturers have come to offer SIM cards with larger storage capacities of up to 1 GB, sufficient for accommodating content information as well.

Memory Card

The memory card is a card type memory device that has a large-capacity flash memory as its storage medium. There are a variety of memory card standards including those for Memory Stick, SD (Secure Digital) card, MMC (Multimedia Card), Compact Flash (registered trademark), and USB (Universal Serial Bus) memory. With a view to storing copyrighted media contents such as music and videos, some memory cards incorporate copyright management technologies.

Memory Card Incorporating SIM and Mass Memory Functions

For applications involving the use of both a nonvolatile memory and a SIM card, the memory card is convenient to use if it incorporates a SIM LSI (large scale integration) chip. For example, proposals have been made (such as one disclosed by JP-A-2004-506266) as to how the cards compatible with ISO/IEC 7816 may be shaped and structured to have pins in compliance with the MMC or SD card standard, and how the cards compatible with the MMC or SD card standard may be modified to include the card circuit structures defined by ISO/IEC 7816.

Proposals have also been made (such as one disclosed by JP-A-2006-523889) as to how a nonvolatile flash memory with its SIM functions compatible with the MMC or SD card standard may be combined with a controller to make up a composite memory card. The physical format of this composite memory card may be that of the plug-in SIM card, MMC, or SD card. In a representative composite memory card, the plug-in SIM card format is utilized, supplemented by a number of external electrical contacts that would allow the memory to operate in compliance with the MMC or SD card standard.

There has also appeared a SIM card-shaped memory card that combines the SIM card functions with a large-capacity nonvolatile memory capability (see "http://www.spansion.com/jp/flash_memory_products/mirrorbit_hd_sim.html" (as of Jan. 22, 2008)). This memory card has the SIM card electrical contacts installed independently of the electrical contacts (e.g., of MMC, USB) provided for access to a nonvolatile memory. Subscriber information for use by the mobile phone and a variety of media contents are managed in a single memory card. A copyright management function is provided to handle data to be stored in the nonvolatile memory capability. By changing his or her card from the old to the new phone terminal, the mobile phone subscriber can transport not only his or her subscriber information but also media contents to the newly acquired phone terminal. The common carrier, for its part, can securely manage both subscriber information and media contents offered to users through carrier content services, using the same card per user. Each mobile phone terminal has no need for a memory card slot.

Noncontact Type IC Card Technology

The noncontact type IC card is an IC card with the previous contact type IC card interface replaced by a wireless interface for connection to external equipment. In order to power itself, the IC card takes advantage of the electromagnetic induction effect brought about by a carrier signal transmitted by a reader/writer. The carrier signal, when suitably modulated, permits communication between the reader/writer and the card. The noncontact type IC card technology is currently used by such services as the electric money "Edy," prepaid electronic transport fare system "Suica" (in Japan), and in-house ID cards.

One of the well-known noncontact IC card systems is "FeLiCa (registered trademark)" in Japan. The FeLiCa system involves the use of electromagnetic induction on a frequency band of 13.56 MHz. Modulation is carried out on a 10-percent amplitude shift keying (ASK) basis. With the Manchester encoding scheme adopted, transmission speeds of up to 212 kbps are attained.

The distance of communication by the noncontact IC card operating on electromagnetic induction is dependent on how its antenna is configured. Illustratively, a typical IC card measuring 86 mm by 54 mm with its periphery encircled by a coil-like antenna can communicate over distances from several to 10 centimeters.

The mobile phones in use across Japan incorporate noncontact IC card technology. For example, the typical mobile phone terminal may carry a mobile FeLiCa IC chip developed by FeLiCa Networks, Inc. The IC chip allows the mobile phone user to utilize the above-mentioned Edy and Suica (mobile Suica) for electronic payment through noncontact data exchanges. Furthermore, the mobile FeLiCa IC chip can be charged with electronic money via a mobile phone network. In such cases, the distance of communication is also dependent on the antenna configuration; each mobile phone terminal is furnished with a coil-shaped antenna surrounding the terminal periphery.

As described above, the typical mobile phone may incorporate the functions of a SIM card, a memory card, and a noncontact IC card in the form of separate media for use in services offered by the common carrier. The SIM card provides information delivery services such as voice calls and a mobile Internet service called i-mode (registered trademark); the memory card offers media content handling services (e.g., downloading of music); and the noncontact IC card technology allows the mobile phone user to utilize electronic money payment and transport fare settlement services.

The mobile phones incorporating the above-outlined card functions have gained widespread acceptance particularly in Japan. One reason for such developments is the implementation of a business model which is specific to Japan and which grants the common carrier wide margins of discretion. According to this business model, various services related to mobile phones have been offered in bulk by the common carrier. In addition, the specifications of the mobile phone terminals to be developed and produced by different manufacturers have basically been worked out by the common carrier at its discretion.

Meanwhile, different business models prevail in Europe, the Unites States and China, among others, where extensive mobile phone markets have developed. According to these business models, common carriers provide users only with SIM cards containing subscriber information; manufacturers are allowed basically to develop mobile phone terminals at their own discretion. It follows that compared with their counterparts in Japan, the common carriers of these regions have only narrow margins of discretion in offering their services to users. Even if a common carrier proposes offering an electronic money service using mobile phones, the service will not be implemented unless the phone manufacturers involved agree to incorporate noncontact communication capabilities in the phone terminals they market.

In the inventors' view, one way to ensure wide margins of discretion for the common carriers offering their services outside Japan is by incorporating diverse functions in the SIM card to be provided to users.

SUMMARY OF THE INVENTION

The present invention has been made in view of the above circumstances and provides a storage medium which has the size and terminal configuration of the SIM card defined by GSM (11.11) and ISO/IEC 7816 and which, when mounted on a mobile phone terminal, furnishes the mobile phone with a plurality of functions including those of a memory card, electronic money, and a credit card.

The present invention also provides a storage medium which has not only a contact type interface for connection to a mobile phone but also a noncontact interface for allowing an external controller to control the data stored on the medium about such service offerings as the memory card, electronic money, and credit card.

The present invention further provides a storage medium which accommodates all circuit components regarding a noncontact interface including an antenna inside the SIM card defined by GSM (11.11) and ISO/IEC 7816 and which, when attached to a mobile phone terminal, ensures sufficient communication performance through the noncontact interface without being interfered with by the components of the phone terminal.

In carrying out the present invention and according to one embodiment thereof, there is provided a storage medium to be attached to a mobile phone for use, the storage medium including: contact type connection means for connecting with the mobile phone; wireless communication means for connecting with a controller located outside; subscriber information storage means for storing subscriber information about a subscriber using the mobile phone; and control means for controlling access to the subscriber information storage means by the mobile phone through the contact type connection means, and access to the subscriber information storage means by the controller through the wireless communication means.

In Japan today, the functions of a SIM card, a memory card, and a noncontact type IC card are incorporated in the form of separate media in the typical mobile phone. These media are utilized by the common carrier offering their services to subscribers. This situation, however, is unique to Japan where prevails the business model involving the common carrier offering a variety of mobile phone-related services in a lump to subscribers. The Japanese business practice is difficult to transplant to markets outside Japan where different business models dominate. In these markets, common carriers provide each user solely with a SIM card containing subscriber information; the carriers have only narrow margins of freedom in offering their services to the users.

In the inventors' view, one way for common carriers outside Japan to secure wider margins of freedom in offering mobile phone-related services is by incorporating diverse functions into the SIM card to be provided to each subscriber. For example, if the SIM card is arranged to have a noncontact IC card capability, the user can easily transport his or her electronic money information from the old phone terminal to a new phone terminal by simply changing the SIM card between the two terminals.

The storage medium according to the embodiment of the present invention is attached to the mobile phone when used. The storage medium includes the contact type connection means for connecting with the mobile phone; the wireless communication means for connecting with an externally located controller; and the subscriber information storage means for storing subscriber information about the subscriber using the mobile phone. The subscriber information storage means can be controlled by the mobile phone via the contact type connection means, as well as by the controller via the wireless communication means.

The storage medium according to the embodiment has the size and terminal configuration of a SIM card defined illustratively by GSM (11.11) and ISO/IEC 7816. The inventive storage medium structured as the SIM card may have not only the SIM function enabling the common carrier to handle subscriber information, but also a credit card function for handling electronic money. The credit card function may be controlled by the controller through wireless communication. If the SIM card is supplemented by a large-capacity memory card function, the control interface of the memory card may be accessed by the controller through wireless communication.

According to the invention, the noncontact credit card function may be readily incorporated into the mobile phone. Since the shape and terminal configuration of the traditional SIM card need not be altered, there is no need to modify the typical mobile phone terminal. This ensures easy implementation of the present invention. When replacing the old mobile phone terminal with a new phone terminal, the user can simply move the SIM card from the old terminal to the new terminal for transfer of necessary information.

The contact type connection means has its SIM interface controlled for data transfer in a manner complying illustratively with ISO/IEC 7816-3. The wireless communication means exchanges command/response APDU's with the controller in a manner defined by ISO/IEC 7816-4.

The contact type connection means acts as a transponder regarding a mobile phone which has a reader/writer capability. The storage medium equipped with the SIM function does not issue commands of itself. In order to have the SIM function execute its own applications, a specific command control sequence is adopted. According to this sequence, the mobile phone issues commands periodically to the medium. In turn, the SIM function indicates the presence or absence of a request by use of status bytes at the end of each command sequence. The mobile phone checks for any request that may have been made by the SIM function.

With the above command control sequence in effect, there is a possibility that an attempt at access to the subscriber information storage means by the controller via the wireless communication means can conflict with a command issued periodically by the mobile phone via the contact type connection means. The result can be command-response inconsistencies interpreted as irregularities between the mobile phone and the storage medium. This can cause the mobile phone to display an error indicator screen preventing the user from operating the phone terminal properly.

The storage medium of the embodiment of the present invention is furnished with the conflict control means to avoid such conflict between the access to the subscriber information storage means by the controller on the one hand, and the access to the subscriber information storage means by the mobile phone via the contact type connection means on the other hand.

The conflict control means may utilize one of the following three control methods to avoid conflict between attempts at access to the subscriber information storage means.

According to the first control method, the access attempt through wireless communication is inhibited as long as a clock signal is being input from the mobile phone. Upon receipt of a command from the controller while wireless communication access is being inhibited, the conflict control means sends a busy response to the controller via the wireless communication means. This prevents wireless communication access from taking place while the mobile phone is accessing the subscriber information storage means.

The second control method is devised to handle the case where a command is issued by the mobile phone requesting status information from the subscriber information storage means while that means is being accessed through wireless communication. Upon receipt of such a command, the conflict control means sends previously stored command response data to the mobile phone without accessing the subscriber information storage means. By disabling the command issued by the mobile phone, it is possible to let the ongoing wireless communication access continue.

The third control method is arranged to deal with the case where access to the subscriber information storage means is attempted by the mobile phone with a command other than a STATUS command while the subscriber information storage means is being accessed by the external controller through wireless communication. If the mobile phone attempts to access the subscriber information storage means while that means is being accessed by the controller via the wireless communication means, then the conflict control means performs a control sequence to let the ongoing command control sequence continue. Specifically, the control sequence may involve retaining the content of the received command, and sending a null sequence byte periodically to the mobile phone. The conflict control means then prompts the controller via the wireless communication means to stop accessing the subscriber information storage means immediately. Upon termination of the wireless communication access by the controller, the conflict control means sends the previously retained content of the received command to the subscriber information storage means. Thereafter, the command control sequence is relayed to the mobile phone. According to the third control method, as outlined, upon receipt of a command other than a STATUS command from the mobile phone during wireless communication access by the controller, the controller is prompted to end its access to the subscriber information storage means, and the command sequence from the mobile phone is allowed to continue. This method prevents the mobile phone from developing an error due to the inability to receive a correct response to certain commands being issued.

The reflected wave transmission scheme may be adopted for the wireless communication means that connects the storage medium with the controller. Reflected wave transmission permits power-saving, high-speed data transfer operations. According to this scheme, the wireless communication means is furnished with a reflector that transmits data using suitably modulated reflected waves. The controller is equipped with a reflected wave reader which sends out an unmodulated carrier signal and which reads data from the modulated reflected waves coming from the reflector. If a frequency band of 2.4 GHz is used for reflected wave transmission, then, say, the FeLiCa card operating on a frequency band of 13.56 MHz may have its antenna reduced appreciably in size. This makes it easier to integrate the SIM card with the wireless communication capability.

Where the antenna for reflected wave transmission is to be incorporated in the storage medium such as the SIM card, the built-in antenna may be provided in two parts: one on the face of the SIM card and the other on the back of it. This is to provide for the possibility of the SIM card being oriented differently (face up or back up) when inserted into the slot of a different mobile phone.

The storage medium according to the present invention, as outlined, has the size and terminal configuration of a SIM card defined by GSM (11.11) and ISO/IEC 7816, and offers a plurality of functions such as those of a memory card, electronic money, and a credit card for use on the mobile phone.

The storage medium of the present invention includes not only the contact type interface for connection with a mobile phone but also the noncontact interface that allows an externally located controller to control the data stored on the medium about such service offerings as memory card, electronic money, and credit card capabilities.

The storage medium according to this invention permits the subscriber information storage means to be accessed both by the mobile phone using an electrical signal via the contact type connection means, and by the external controller through wireless communication via the wireless communication means. The conflict control means of the inventive storage medium works to avoid conflicts between contending attempts to access the subscriber information storage means in diverse situations, e.g., where an attempt is made by the controller to access the subscriber information storage means wirelessly while a clock signal is being input from the mobile phone, or where the mobile phone with its STATUS command or some other command attempts to access the subscriber information storage means while that means is being accessed wirelessly by the controller. With such potential conflicts suitably averted, the mobile phone is protected from developing a conflict-induced error upon command access.

BRIEF DESCRIPTION OF THE DRAWINGS

FIG. 1A is a block diagram showing a typical structure of a storage medium practiced as one embodiment of the present invention;

FIG. 3 is a schematic view showing a typical command control sequence under the T0 protocol;

FIG. 15 is a tabular view listing the processes performed by the conflict control section in each of the states indicated in the state transition diagram of FIG. 14;

DETAILED DESCRIPTION OF THE PREFERRED EMBODIMENTS

Figure 1B:
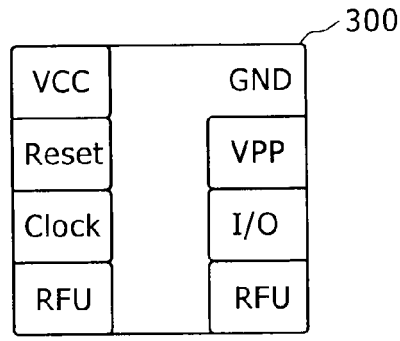
FIG. 1B is a schematic view showing a typical structure of a SIM terminal section.

The preferred embodiments of the present invention will now be described in detail with reference to the accompanying drawings.

Today in Japan, the typical mobile phone incorporates the functions of a SIM card, a memory card, and a noncontact IC card in the form of separate media for use in services offered by the common carrier. This is a business model specific to Japan and one in which various services related to mobile phones are offered to their subscribers in a lump by the common carrier. This Japanese business practice is difficult to transplant to markets outside Japan where common carriers provide each user solely with a SIM card containing subscriber information. According to this business practice, the carriers have only narrow margins of discretion in offering their services to the users.

In the inventors' view, one way for common carriers outside Japan to secure wider margins of freedom in offering mobile phone-related services is by incorporating diverse functions into the SIM card to be provided to each subscriber.

For example, if the SIM card is arranged to have a noncontact IC card capability, the user can easily transport his or her electronic money information from the old phone terminal to a new phone terminal by simply changing the SIM card between the two terminals.

Japanese Patent Application No. 2007-48289 assigned to the applicant of this invention proposes a storage medium having a SIM card furnished with noncontact IC card technology. Using this type of storage medium ensures the size and terminal configuration of the SIM card defined by GSM (11.11) and ISO/IEC 7816 and allows the host mobile phone to offer a plurality of functions such as memory card, electronic money, and credit card capabilities. Since there is no need to alter the shape and terminal configuration of the typical SIM card, the ordinary mobile phone need not be modified in any way. These advantages make it easy to implement the present invention. Upon replacement of the old mobile phone terminal with a new one, the existing information can be transferred to the new terminal by simply changing the SIM card from the old phone to the new one.

FIG. 1A schematically shows a typical structure of a storage medium 1 practiced as one embodiment of the present invention. In FIG. 1A, the storage medium 1 is shown to include a SIM (Subscriber Identity Module) function section 13 made of a SIM terminal section 300, a SIM interface controller 301, a CPU (central processing unit) 302, a system bus 303, a ROM (read only memory) 304, a RAM (random access memory) 305, an encryption block 306, and an EEPROM (electrically erasable programmable ROM) 307. The SIM function section 13 combines with an antenna 12, a noncontact wireless section 11, and a conflict control section 10, all placed in an enclosure of the SIM card configuration. With this structure, the storage medium 1 functions as an ordinary SIM card on the mobile phone 2 via a SIM interface 4. A controller 3 can make use of the SIM functions of the storage medium 1 via a wireless interface 5.

FIG. 1B schematically shows a typical structure of the SIM terminal section 300. The SIM terminal section 300 is an electrical signal terminal block for use with the SIM interface 4. In compliance with ISO/IEC 7816-1/2, the terminal block has a power (VCC) terminal, a reset (Reset) terminal, a clock (Clock) terminal, a program power (VPP) terminal, a data input/output (I/O) terminal, a ground (GND) terminal, and reserved (RFU: Reserved for Future Use) terminals laid out as illustrated.

The SIM interface 4 in FIG. 1 complies with ISO/IEC 7816. The storage medium 1 inputs a clock signal (Clock) and a reset signal (Reset) from the mobile phone and, using an input/output signal (I/O) synchronized with a predetermined clock count for half-duplex serial communication, exchanges byte data (i.e., characters) with the mobile phone 2. Under the so-called T0 protocol, command data formed by a series of byte data is exchanged between the mobile phone 2 and the storage medium 1.

The reflected wave transmission scheme may be adopted by the wireless interface 5 for interfacing the noncontact wireless section 11 with the controller 3. In this setup, the wireless communication section 11 is furnished with a reflector that transmits data using suitably modulated reflected waves. The controller 3 is equipped with a reflected wave reader which sends out an unmodulated carrier signal and which reads data from the modulated reflected waves coming from the reflector. If a frequency band of 2.4 GHz is used for reflected wave transmission, then, say, the FeLiCa card operating on a frequency band of 13.56 MHz may have its antenna reduced appreciably in size. This makes it easier to integrate the SIM card with the wireless communication capability.

Where the antenna 12 for reflected wave transmission is to be incorporated in the storage medium 1 such as the SIM card, the built-in antenna 12 may be provided in two parts: one on the face of the SIM card and the other on the back of it. This is to provide for the possibility of the SIM card being oriented differently (face up or back up) when inserted into the slot of a different mobile phone.

For more details about reflected wave transmission systems, refer to Japanese Patent Laid-Open Nos. 2005-64822 and 2005-323223 assigned to the applicant of this invention.

Figure 2:
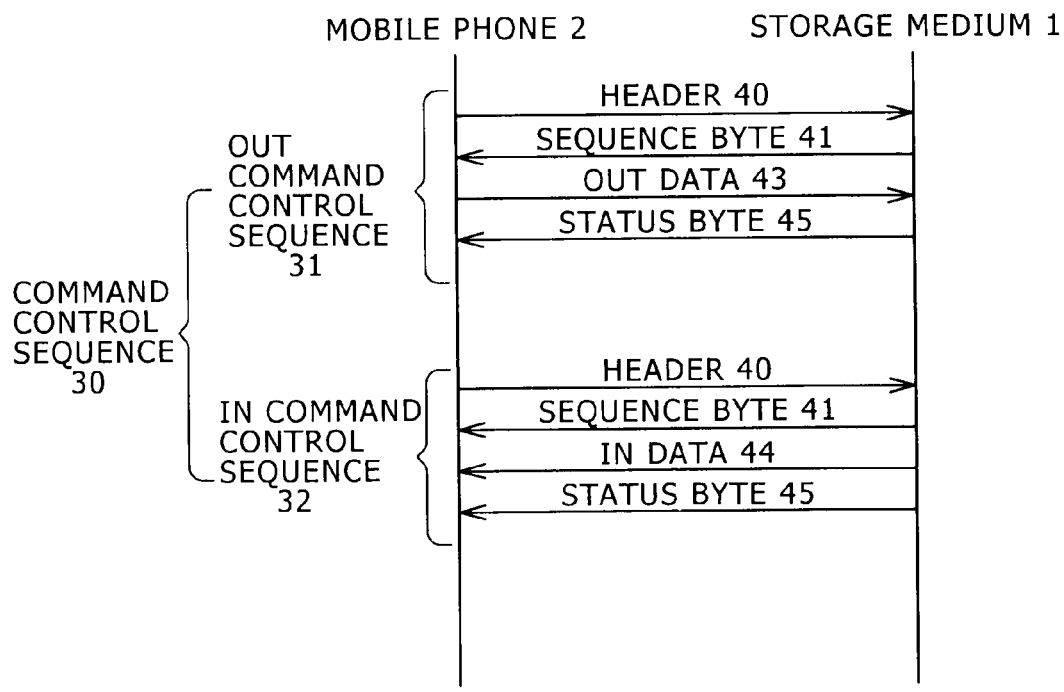
FIG. 2 is a schematic view showing a typical format of command data under the T0 protocol for use in communication through a SIM interface.

FIG. 2 schematically shows a typical format of command data under the T0 protocol for use in communication through the SIM interface 4.

A header 40 is made up of parameters CLA, INS, P1, P2 and P3, one byte long each and issued by the mobile phone 2. The parameter CLA is a fixed-value parameter that provides information about the class regarding the card functions. For a SIM card compliant with GSM, the parameter CLA is fixed to 0xA0. The parameter INS provides the content of the command according to the class. The parameters P1 and P2 accompany the content of the command. The parameter P3 provides the data length applicable to data 42 that follows.

A sequence byte 41 constitutes response data given by the storage medium 1 regarding the header 40. In a normal response, the same value as that of the parameter INS is given. Also provided is a sequence byte (null sequence byte) called a null byte (value=0x60) for directing that the command processing of the storage medium 1 be awaited.

The data 42 accompanies the command. There are two kinds of data: the data output by the mobile phone 2 is called out-data 43, and the data output by the storage medium 1 is called in-data 44. The direction of the data being sent or received is determined by the content of the command.

The data 42 is followed by status bytes 45 output by the storage medium 1. The status bytes 45 are made up of two bytes WS1 and WS2. The two-byte combination signals end status of the command. Depending on the content of the byte SW1, the byte SW2 signals the length of the data that can be received by issuing a particular command (GET_RESPONSE command, FETCH command, etc.).

FIG. 3 schematically shows a typical command control sequence under the T0 protocol for use in communication via the SIM interface 4. The command control sequence 30 shown in FIG. 3 is one of two sequences, an out-command control sequence 31 or an in-command control sequence 32 depending on the direction of the data 42. The out-command control sequence 31 is a sequence in which the mobile phone 2 outputs out-data 43 subsequent to sequence bytes 41 and in which the storage medium 1 having received the out-data 43 returns status bytes 45. The in-command control sequence 32 is a sequence in which the storage medium 1 outputs in-data 44 and in which the mobile phone 2 having received the in-data 44 returns status bytes 45.

One of the SIM functions applicable to GSM is called SIM Took Kit (STK) defined by GSM 11.14. This is a function that enables the mobile phone 2 to carry out SIM applications. Under the T0 protocol defined by ISO/IEC 7816, the mobile phone 2 acts as a reader/writer and the storage medium 1 as a transponder. That means the storage medium (SIM) 1 cannot issue commands of itself. Instead, the storage medium 1 signals the presence or absence of any request using status bytes 45 at the end of a given command sequence. If there is a request, then the byte SW1 is set for 0x91 in the status bytes 45. In order to check for requests from the storage medium 1, the mobile phone 2 periodically issues commands, the STATUS command in particular, regardless of the ongoing operations.

Figure 4:
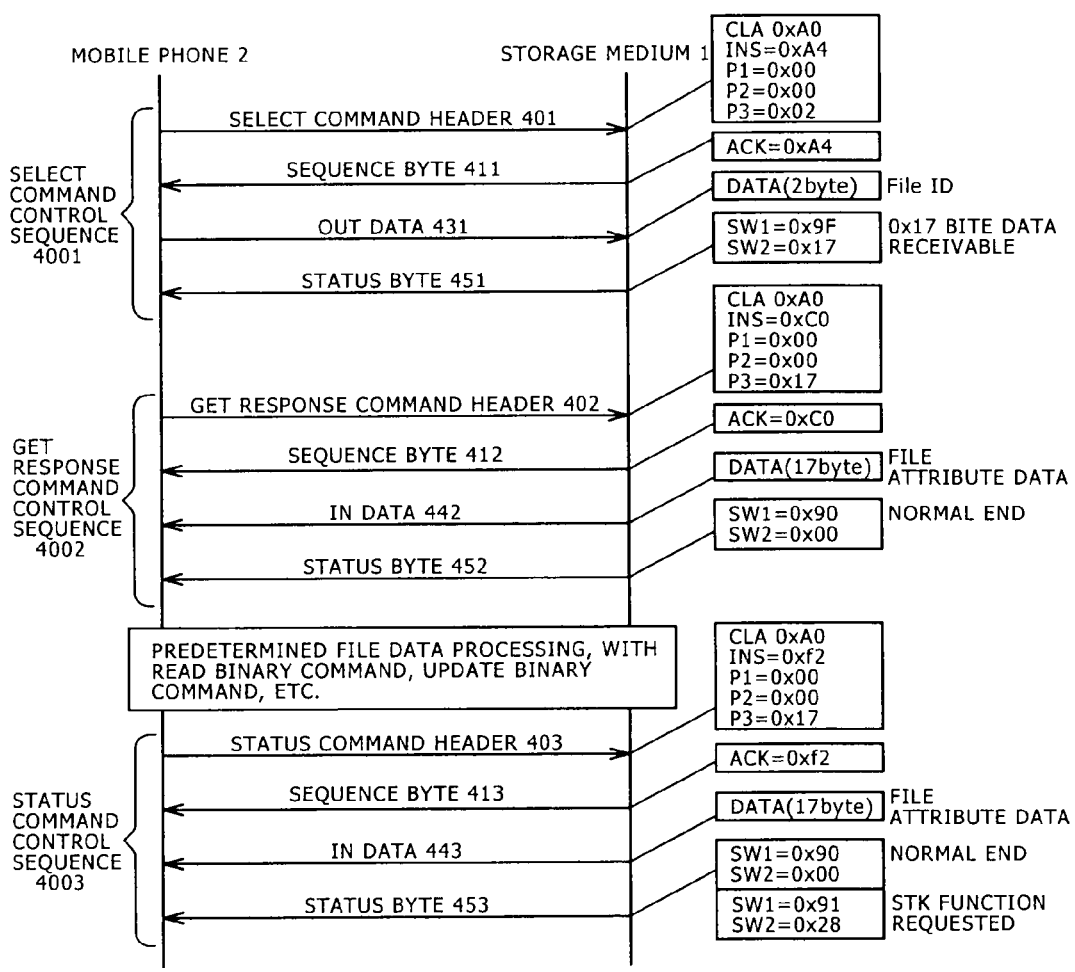
FIG. 4 is a schematic view showing typical command control sequences associated with a STATUS command.

FIG. 4 schematically shows a typical command control sequence regarding a STATUS command.

Before the execution of a STATUS command control sequence 4003, a SELECT command control sequence 4001 and a GET RESPONSE command control sequence 4002 are always carried out consecutively.

The SELECT command is used by the mobile phone 2 to selectively designate file data managed by the SIM function section 13. A two-byte file ID is placed in out-data 431 for output to the storage medium 1.

On receiving the SELECT command from the mobile phone 2, the storage medium 1 reads internally the file attribute data corresponding to the file ID designated by the command. The storage medium 1 then returns a value SW1=0x9F as part of status bytes 451. This value indicates that the mobile phone 2 is allowed to read the file attribute data using a subsequent GET RESPONSE command header 402 and that the immediately following value SW2 designates the length of the data of interest.

In the ensuing GET RESPONSE command control sequence 4002, the data length found in the value SW2 is designated in the P3 parameter of the header 402 bound for the storage medium 1. This puts the file attribute data into in-data 442 that is sent to the mobile phone 2. Status bytes 452 bound for the mobile phone 2 are made up of values SW1=0x90 and SW2=0x00. These values indicate a normal end of the sequence.

Thereafter, the file data in question is subjected to such processes as read and write operations. These processes involve the use of READ BINARY and UPDATE BINARY commands, among others.

The STATUS command control sequence 4003 is an in-command control sequence. The in-data 443 to be received during the sequence by the mobile phone 2 is the same as the in-data 442 received during the preceding GET RESPONSE command control sequence 4002. Status bytes 453 are set with values SW1=0x90 and SW2=0x00 indicating a normal end of the sequence. If there is a request from an application offered by the STK function (described above), then the value SW1 is set to 0x91. The value SW2 contains the designated length of the data of which the receipt is requested by the STK function.

Upon receipt of the status bytes 453 from the storage medium 1, the mobile phone 2 issues a FETCH command to receive the data requested by the STK function (described above). At the same time, the mobile phone 2 performs application processing requested by the STK function. This sequence, however, is irrelevant to the scope of the present invention and thus will not be discussed further.

In the manner described above, the mobile phone 2 continuously accesses the SIM function section 13 of the storage medium 1. The mobile phone 2 issues the STATUS command periodically not only during the user's operations on the phone 2 but also when no operations are carried out. In such cases, there is a possibility that an attempt to access the SIM function section 13 of the storage medium 1 by the controller 3 through wireless communication can conflict with an access attempt by way of the SIM interface 4. The conflict may trigger command-response inconsistencies between the mobile phone 2 and the storage medium 1. Such inconsistencies are considered an error causing the mobile phone 2 to display an error indicator screen. This can prevent the user from normally operating the mobile phone 2.

This embodiment is furnished with the conflict control section 10 to avoid such conflict between the access to the SIM function section 13 via the wireless interface 5 and the access to the SIM function section 13 via the SIM interface 4.

Illustratively, the conflict control section 10 may utilize one of the following three control methods to avoid conflict between attempts at access to the SIM function section 13.

According to the first control method, access through wireless communication is inhibited as long as the clock signal is being input from the mobile phone 2. If a command is received from the controller 3 while the wireless access is being inhibited, the storage medium 1 sends a busy response to the controller 3. This prevents wireless communication access from taking place while the mobile phone 2 is accessing the storage medium 1.

The second control method is devised to handle the case where a STATUS command is issued by the mobile phone 2 while the SIM function section 13 is being accessed through wireless communication. In that case, the conflict control section 10 sends previously stored STATUS command response data to the mobile phone 2 without accessing the SIM function section 13. When the STATUS command is issued with no operations performed on the mobile phone 2, the ongoing wireless communication access is allowed to continue.

The third control method is arranged to deal with the case where access to the SIM function section 13 is attempted by the mobile phone 2 using a command other than a STATUS command while the SIM function section 13 is being accessed by the external controller 3 through wireless communication. Upon receipt of a header 40, the conflict control section 10 retains the header 40 and sends a null sequence byte periodically to the mobile phone 2 to let the ongoing command control sequence continue (or to keep the sequence waiting to end). IEC 7816 defines a sequence in which the IC card sends a null sequence byte to the mobile phone at intervals short enough to stave off a time-out. In parallel with transmission of the null sequence byte, the conflict control section 10 prompts the controller 3 to stop accessing the SIM function section 13 immediately via the noncontact wireless section 11 by informing the controller 3 of the access attempt by the mobile phone 2 using a response frame. Upon completion of the wireless communication access by the controller 3, the conflict control section 10 sends the previously retained header 40 to the SIM function section 13. Thereafter, the command control sequence is relayed to the mobile phone 2. According to the third control method, upon receipt of a command other than the STATUS command from the mobile phone 2 during wireless communication access by the controller 3, the controller 3 is prompted to end its wireless communication access, and the command sequence from the mobile phone 2 is allowed to continue. This method prevents the mobile phone 2 from developing an error due to the inability to receive a correct response to certain commands being issued.

Below is a description of how the conflict control section 10 works in the storage medium 1. The description will be followed by explanations of the first through the third control methods mentioned above.

Figure 5:
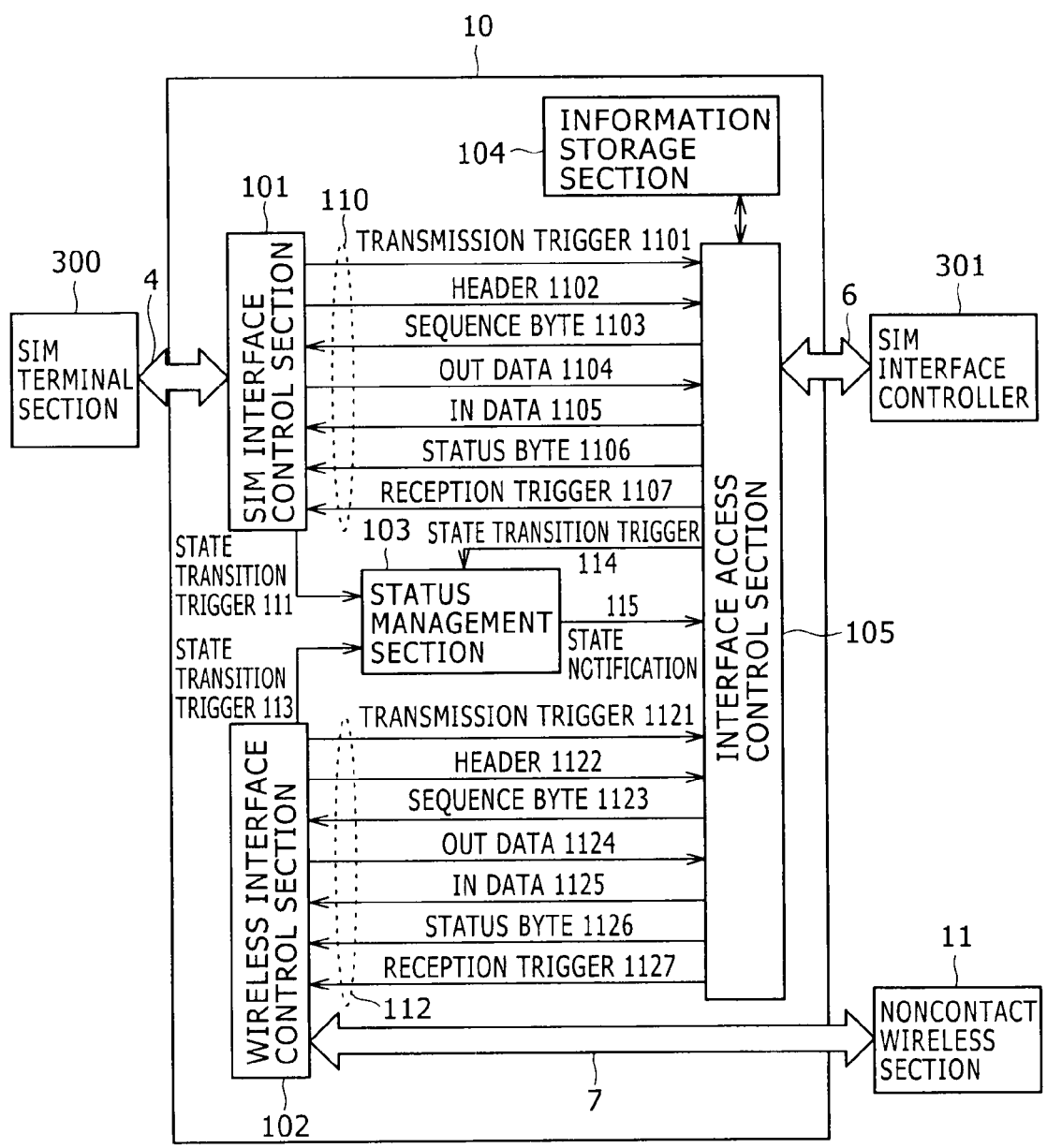
FIG. 5 is a schematic view showing a typical internal structure of a conflict control section indicated in FIG. 1.

FIG. 5 is a schematic view showing a typical internal structure of the conflict control section 10 indicated in FIG. 1A. The conflict control section 10 in FIG. 5 includes a SIM interface control section 101, a wireless interface control section 102, a status management section 103, an information storage section 104, and an interface access control section 105.

The SIM interface control section 101 carries out electrical and logical interface control on the SIM interface 4 in compliance with ISO/IEC 7816. Through an interface 110 to the interface access control section 105, the SIM interface control section 101 sends and receives command/response data in increments of a data unit shown in FIG. 2.

The SIM interface control section 101 sends a header 1102 and out-data 1104 using a transmission trigger 1101 in the direction of the interface access control section 105. In turn, the interface access control section 105 sends a sequence byte (ACK) 1103, in-data 1105, and status bytes 1106 using a reception trigger 1107 in the direction of the SIM interface control section 101.

Furthermore, the SIM interface control section 101 detects whether a DEV_CLK signal is being output or stopped, whether any command is received from the mobile phone 2, and whether a response is sent to the mobile phone 2. The results of the detection are sent to the status management section 103 by the SIM interface control section 101 using a state transition trigger 111.

The wireless interface control section 102 effects data control on a noncontact wireless section interface 7. An interface 112 to the interface access control section 105 is structured the same as the interface 110. The wireless interface control section 102 detects the reception of command frame data from the noncontact wireless section 11 and the transmission of a response frame, and informs the status management section 103 of such reception and transmission using a state transition trigger 113.

The status management section 103 is a state machine that manages state transitions reflecting the above-mentioned state transition triggers 111 and 113 as well as a state transition trigger 114 coming from the interface access control section 105. The resulting states are signaled to the interface access control section 105 through a state notification 115.

Where the above-mentioned second control method is in effect, the information storage section 104 stores the file ID from the mobile phone 2 side, file attribute information, and status bytes. Where the third control method is in effect, the information storage section 104 retains header information. When wireless access is restored subsequent to the access by the mobile phone 2 (as will be discussed later), the information storage section 104 stores the file ID from the wireless side.

The interface access control section 105 performs electrical and logical interface control as well as data control over the SIM interface controller 301 with regard to a transmission trigger 1101 or 1121 from the SIM interface control section 101 or from the wireless interface control section 102 in a manner complying with ISO/IEC 7816. The interface access control section 105 sends response data to the relevant control section. In response to the status signaled by the status management section 103, one of the first through the third control methods is brought in practice, as will be described later in detail.

Figure 6:
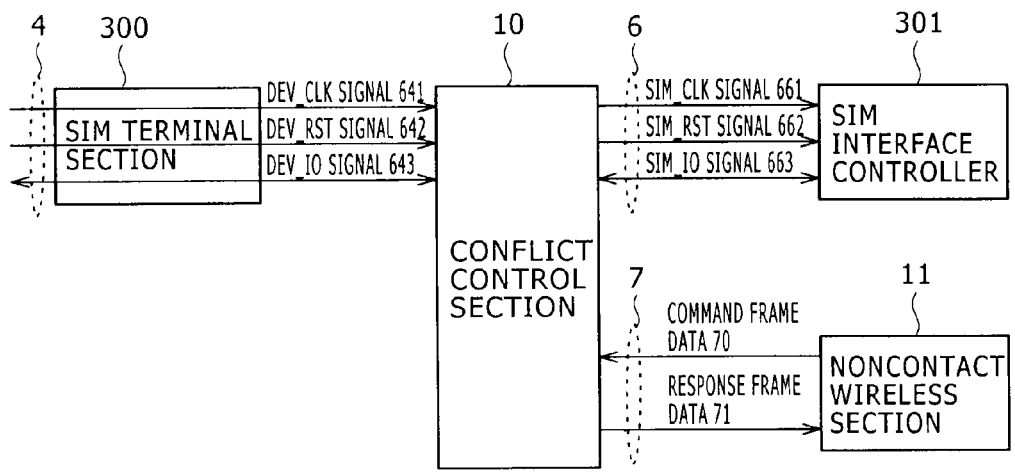
FIG. 6 is a schematic view showing detailed structures of interfaces between the conflict control section indicated in FIG. 5 on the one hand; and the SIM terminal section, a SIM interface controller, and a noncontact wireless section on the other hand.

FIG. 6 schematically shows detailed structures of the interfaces 4, 6 and 7 between the conflict control section 10 indicated in FIG. 5 on the one hand; and the SIM terminal section 300, SIM interface controller 301, and noncontact wireless section 11 on the other hand.

The SIM interface 4 is an electrical signal arrangement defined by ISO/IEC 7816. As such, the SIM interface 4 allows a clock signal (DEV_CLK) 641 and a reset signal (DEV_RST) 642 from the mobile phone 2 to enter the conflict control section 10 and enables serial data to be input or output on a half-duplex basis using an input/output signal (DEV_IO) 643.

A SIM interface controller interface 6 is an electrical signal arrangement similar to that of the SIM interface 4. As such, the SIM interface controller interface 6 allows a clock signal (SIM_CLK) 661 and a reset signal (SIM_RST) 662 to be output to the SIM interface controller 301 and enables serial data to be input or output on a half-duplex basis using an input/output signal (SIM_IO) 663.

Figure 7:
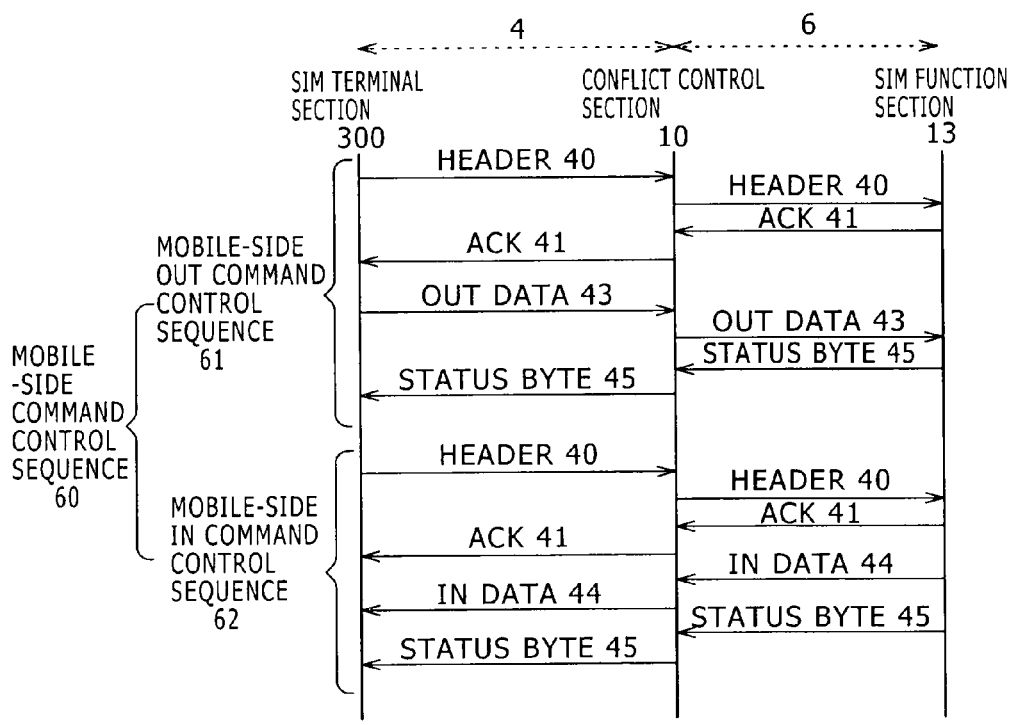
FIG. 7 is a schematic view showing the operation sequence of the conflict control section in effect when a mobile phone accesses the storage medium under the T0 protocol.

FIG. 7 schematically shows the operation sequence of the conflict control section 10 in effect when the mobile phone 2 accesses the storage medium 1 under the T0 protocol.

The conflict control section 10 performs through control involving serial data exchanges between the DEV_IO signal 643 and the SIM_IO signal 663 in increments of a header 40, a sequence byte (ACK) 41, data 42 (out-data 43, in-data 44), and status bytes 45 as shown in FIG. 2. In that manner, the conflict control section 10 carries out a mobile-side command control sequence 60 identical to the command control sequence 30 in FIG. 3 involving the SIM interface 4 and SIM interface controller interface 6.

In a mobile-side out-command control sequence 61, the conflict control section 10 waits for a five-byte header 40 to be received from the DEV_IO signal 643. After the header 40 has been received, the conflict control section 10 outputs the header 40 to the SIM_IO signal 663.

The conflict control section 10 then waits for a one-byte ACK signal 41 to be received from the SIM_IO signal 663. After the ACK signal 41 has been received, the conflict control section 10 outputs the ACK signal 41 to the DEV_IO signal 643.

The conflict control section 10 waits for out-data 43 of as many bytes as the number designated by the P3 parameter of the header 40, to be received from the DEV_IO signal 643. After the out-data 43 has been received, the conflict control section 10 outputs the out-data 43 to the SIM_IO signal 663.

The conflict control section 10 then waits for status bytes 45 to be received from the SIM_IO signal 663. After the status bytes 45 have been received, the conflict control section 10 outputs the status bytes 45 to the DEV_IO signal 643. This brings the mobile-side out-command control sequence 61 to an end.

In a mobile-side in-command control sequence 62, as in the above-described mobile-side out-command control sequence 61, the conflict control section 10 first carries out through control on the header 40 and ACK signal 41, and waits for in-data 44 to be received from the SIM_IO signal 663. The difference from the mobile-side out-command control sequence 61 is that after the in-data 44 has been received, the conflict control section 10 outputs the in-data to the DEV_IO signal 643.

Following through control on the ACK signal 41, the conflict control section 10 receives either the out-data 43 from the DEV_IO signal 643 or the in-data 44 from the SIM_IO signal 663. Which of the two kinds of data is to be received is determined by the INS parameter obtained upon receipt of the header 40.

Figure 8:
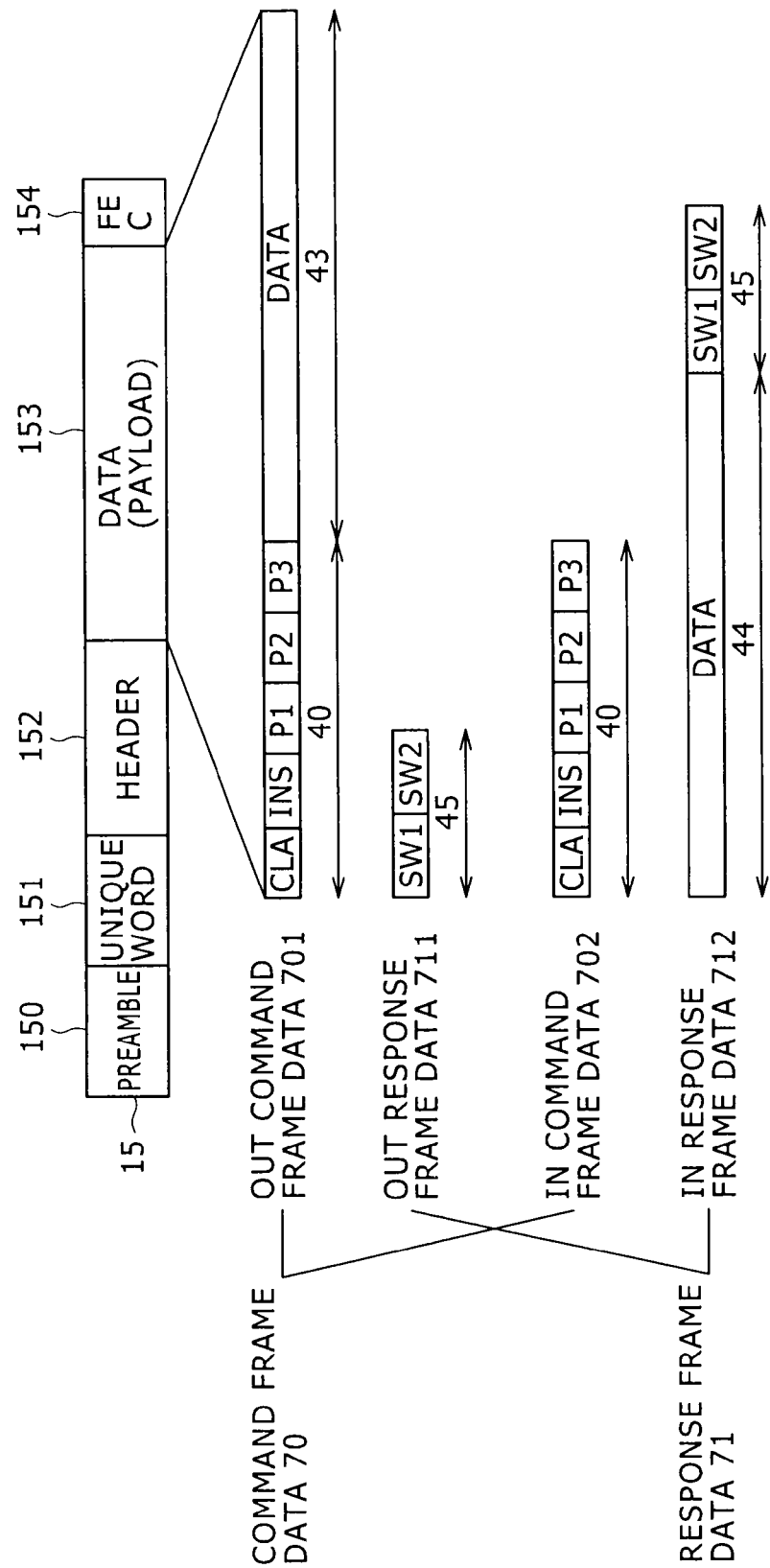
FIG. 8 is a schematic view showing typical structures of command and response frames in wireless frames.

FIG. 8 schematically shows typical structures of command and response frames in wireless frames. A payload field 153 in a wireless frame 15 is set with a header 40, out-data 43, in-data 44, and status bytes 45. This structure makes it possible to implement wireless transmission and reception of command data regarding the IC card in compliance with the T0 protocol (discussed above) defined by IEC 7816.

Command frame data 70 is divided into out-command frame data 701 and in-command frame data 702. Response frame data 71 is grouped into out-response frame data 711 and in-response frame data 712. With regard to the out-command control sequence 31 shown in FIG. 3, the out-command frame data 701 and out-response frame data 711 are constituted. With respect to the in-command control sequence 32, the in-command frame data 702 and in-response frame data 712 are constituted.

The noncontact wireless section interface 7 in FIG. 6 permits command data exchanges with the conflict control section 10 in conjunction with the transmission and reception of commands and responses to and from the controller through wireless communication. The noncontact wireless section interface 7 allows the noncontact wireless section 11 to output command frame data 70 and permits the conflict control section 10 to output response frame data 71.

Figure 9:
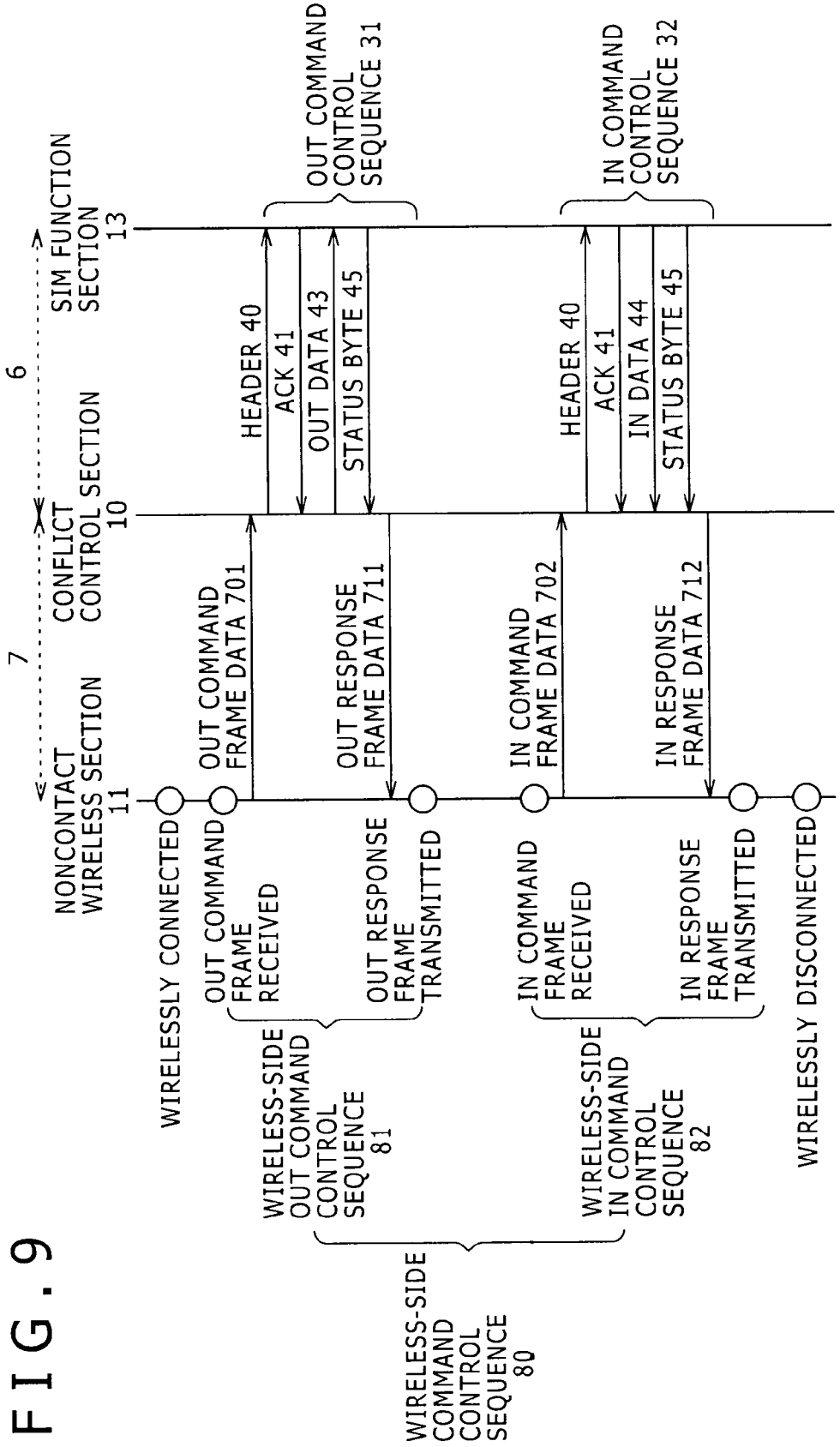
FIG. 9 is a schematic view showing the operation sequences of the conflict control section in effect when the mobile phone accesses the storage medium using wireless frames.

FIG. 9 schematically shows the operation sequences of the conflict control section 10 in effect when the mobile phone 2 accesses the storage medium 1 using wireless frames.

Where wireless connection is established with the controller 3, a wireless-side out-command control sequence 81 is defined for the reception of the out-command frame data 701 shown in FIG. 8, and a wireless-side in-command control sequence 82 is defined for the reception of the in-command frame data 702 also indicated in FIG. 8. Both the wireless-side out-command control sequence 81 and the wireless-side in-command control sequence 82 are subsumed under what is defined as a wireless-side command control sequence 80.

When the wireless-side out-command control sequence 81 is in effect, the noncontact wireless section 11 first receives an out-command frame from the controller 3. Upon receipt of the out-command frame, the noncontact wireless section 11 performs through control involving the transfer to the conflict control section 10 of the out-command frame data 701 included in the received frame.

In compliance with ISO/IEC 7816, the conflict control section 10 carries out the out-command control sequence 31 shown in FIG. 3 for the SIM interface controller 301 inside the SIM function section 13, thereby acquiring status bytes 45 from the SIM function section 13. Based on the status bytes 45, the conflict control section 10 composes out-response frame data 711 and outputs the data 711 to the noncontact wireless section 11. In turn, the noncontact wireless section 11 sends an out-response frame to the controller 3.

Meanwhile, in the wireless-side in-command control sequence 82, the noncontact wireless section 11 receives an in-command frame from the controller 3. Upon receipt of the in-command frame, the noncontact wireless section 11 performs through control involving the transfer to the conflict control section 10 of in-command frame data 702 included in the received frame.

In compliance with ISO/IEC 7816, the conflict control section 10 carries out the in-command control sequence 32 shown in FIG. 3 for the SIM function section 13, thereby acquiring in-data 44 and status bytes 45 from the SIM function section 13. Based on the in-data 44 and status bytes 45, the conflict control section 10 composes in-response frame data 712 and outputs the data 712 to the noncontact wireless section 11. In turn, the noncontact wireless section 11 sends an in-response frame to the controller 3.

As described, the conflict control section 10 performs the mobile-side command control sequence 60 (shown in FIG. 7) between the SIM interface 4 and the SIM interface controller interface 6 with regard to the access from the mobile phone 2 to the SIM function section 13, whereby the command control sequence 30 is relayed. Regarding the access from the controller 3 to the SIM function section 13, the conflict control section 10 carries out the wireless command control sequence 80 (shown in FIG. 9) between the noncontact wireless section interface 7 and the SIM interface controller interface 6, whereby the command control sequence 30 is relayed.

The SIM interface controller interface 6 is shared by the mobile phone 2 and controller 3 when each of them attempts to access the SIM function section 13. That means there is a possibility that two attempts to access the section 13 can conflict with each other; such access attempts must be controlled suitably to avert the conflict therebetween. Since the mobile phone 2 issues the STATUS command periodically (as explained above), access conflict is expected to occur frequently.

With this embodiment, the conflict control section 10 controls access conflict using one of the first through the third control methods outlined above. What follows is a more detailed description of the first through the third control methods.

First Control Method

Figure 10:
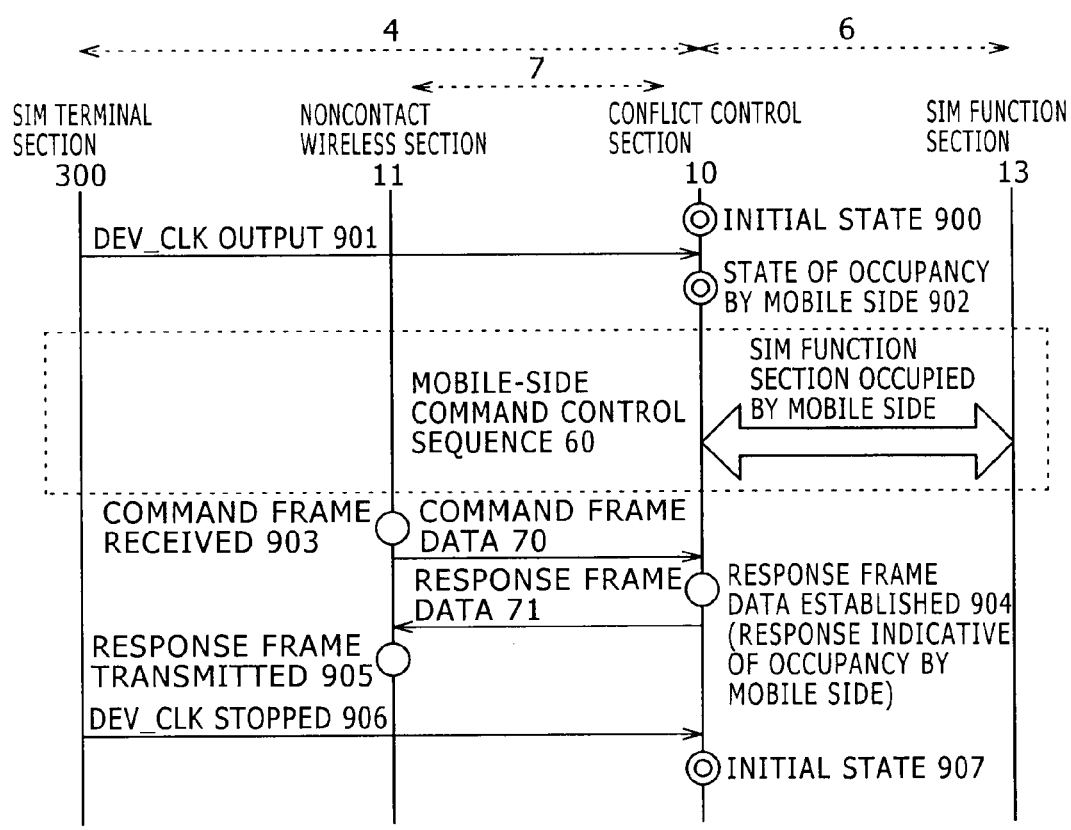
FIG. 10 is a schematic view showing the operation sequences in effect when the conflict control section using the first control method works to avoid conflict between attempts at access to a SIM function section by the mobile phone and by a controller.

According to the first control method, access from the controller 3 through wireless communication is inhibited as long as the clock signal (DEV_CLK) is being input from the mobile phone 2; only the mobile phone 2 is allowed to access the SIM function section 13. The first control method is effected as will be explained below in reference to the sequence diagram of FIG. 10.

In the initial state (900), the conflict control section 10 detects a clock signal (DEV_CLK) 901 coming from the mobile phone 2. Upon detection of the clock signal, the conflict control section 10 reaches the state of occupancy by the mobile side (902).

In the state of occupancy by the mobile side, the mobile phone 2 occupies the SIM function section 13. In this state, the mobile-side command control sequence 60 shown in FIG. 7 is allowed to be carried out.

In the state of occupancy by the mobile side, access to the SIM function section 13 by the controller 3 is inhibited. When the noncontact wireless section 11 receives a command frame (903) and command frame data 70 reaches the conflict control section 10, the conflict control section 10 does not access the SIM function section 13, creates status bytes 45 indicating that the SIM function section 13 is being occupied by the mobile phone 2, and composes response frame data 71 (904). The conflict control section 10 sends a response frame to the controller 3 via the noncontact wireless section 11 (905). In this manner, while the SIM function section 13 is being occupied by the mobile phone 2, an attempt to access the SIM function section 13 with a command from the wireless side is suppressed to avoid access conflict.

When the output of the clock signal DEV_CLK from the mobile phone 2 is stopped (906), the initial state is restored (907).

Second Control Method

The second control method is devised so as to handle the case where a STATUS command is issued by the mobile phone 2 while the SIM function section 13 is being accessed through wireless communication. In that case, the conflict control section 10 sends previously stored STATUS command response data to the mobile phone 2 without accessing the SIM function section 13.

Figure 11:
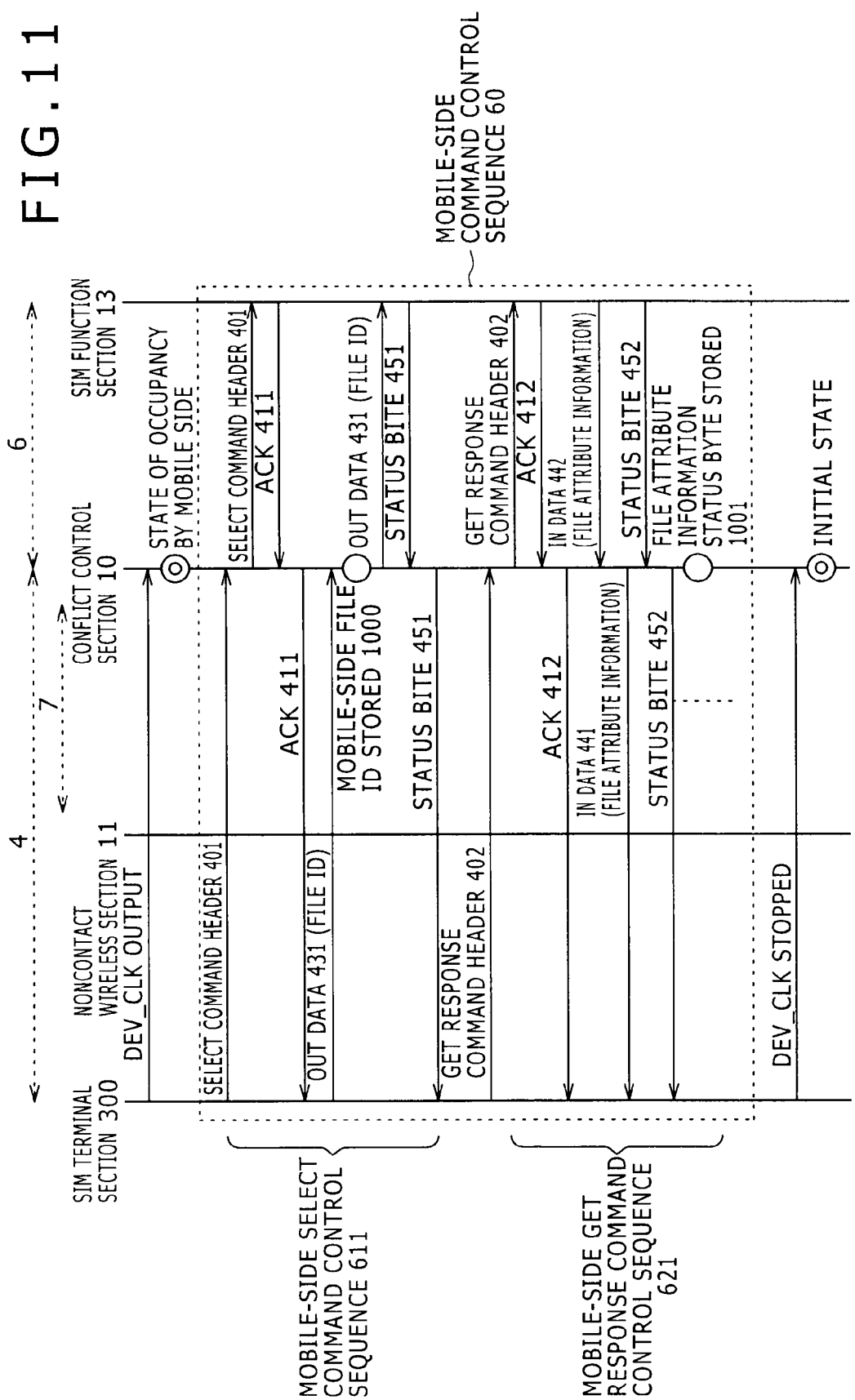
FIG. 11 is a schematic view showing the operation sequences in effect when the conflict control section using the second control method works to avoid conflict between attempts at access to the SIM function section by the mobile phone and by the controller.

Described below in reference to the sequence diagram of FIG. 11 is how the conflict control section 10 stores the STATUS command response data in advance according to the second control method.

The conflict control section 10 detects a clock signal DEV_CLK coming from the mobile phone 2. Upon receipt of the DEV_CLK signal, the conflict control section 10 reaches the state of occupancy by the mobile side. In this state, the mobile-side command control sequence 60 shown in FIG. 7 is allowed to be carried out.

In the mobile-side command control sequence 60, the conflict control section 10 performs through control involving the transfer of serial data between an input/output signal DEV_IO 643 and an input/output signal SIM_IO 663 in increments of the data unit made up of a header 40, a sequence byte (ACK) 41, data 42 (out-data 43, in-data 44), and status bytes 45 as shown in FIG. 2.

If a SELECT command is received from the mobile phone 2 via the SIM terminal section 300, then the conflict control section 10 stores the out-data 431 received from the SIM terminal section 300 as a mobile-side file ID (1000).

In the GET RESPONSE command control sequence carried out following the SELECT command, the conflict control section 10 stores the in-data 442 and status bytes 452 received from the SIM function section 13 (1001).

When the output of the clock signal DEV_CLK from the mobile phone 2 is stopped, the initial state is restored.

Figure 12:
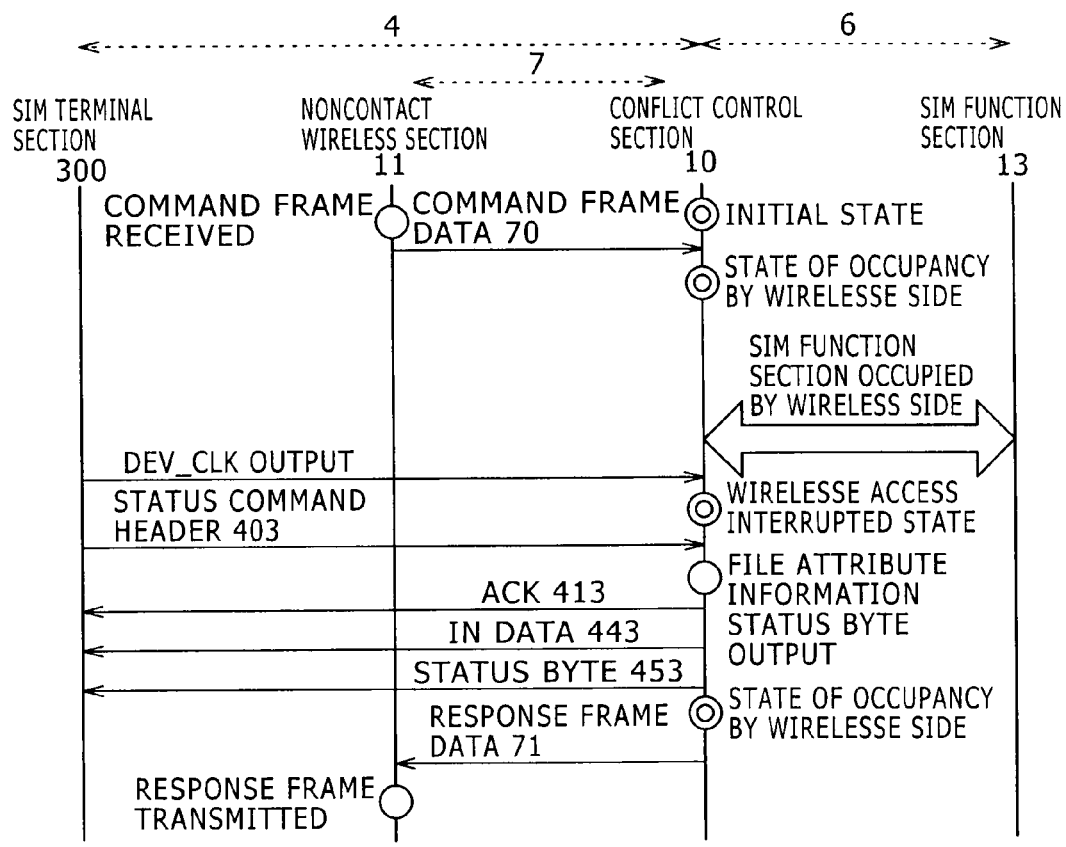
FIG. 12 is another schematic view showing the operation sequences in effect when the conflict control section using the second control method works to avoid conflict between attempts at access to the SIM function section by the mobile phone and by the controller.

Explained below in reference to the sequence diagram of FIG. 12 is how the conflict control section 10, resorting to the second control method, sends the previously stored STATUS command response data to the mobile phone 2 while wireless access is underway.

In the initial state, the conflict control section 10 detects a command frame 70 coming from the noncontact wireless section 11. Upon detection of the command frame 70, the conflict control section 10 reaches the state of occupancy by the wireless side. In this state, the SIM function section 13 is occupied by the controller 3 through wireless access while attempts at access by the mobile phone 2 are inhibited.

In the state of occupancy by the wireless side, the conflict control section 10 detects a clock signal DEV_CLK coming from the SIM terminal section 300. Upon detection of the DEV_CLK signal, the conflict control section 10 reaches a wireless access interrupted state. Upon receipt of a STATUS command header 403, the conflict control section 10 sends an ACK signal 413 to the mobile phone 2 via the SIM terminal section 300 without accessing the SIM function section 13.

The conflict control section 10 then sends in-data 443 to the mobile phone 2 via the SIM terminal section 300. The in-data 443 is composed of the file attribute information stored beforehand in the processing sequence shown in FIG. 11. The conflict control section 10 further sends status bytes 453 stored previously in like manner to the mobile phone 2 via the SIM terminal section 300.

Thereafter, the conflict control section 10 returns to the state of occupancy by the wireless side. In this state, the conflict control section 10 sends response frame data 71 regarding the command frame data 70 to the controller 3 via the noncontact wireless section 11.

After transmitting the response frame data 71 to the noncontact wireless section 11, the conflict control section 10 maintains the state of occupancy by the wireless side.

As described above, if a STATUS command is received from the mobile phone 2 while the SIM function section 13 is being accessed wirelessly, the conflict control section 10 sends a predetermined response to the mobile phone 2. This arrangement suppresses potential conflict between the attempts at access to the SIM function section 13 and allows the ongoing wireless access from the controller 3 to continue.

Third Control Method

The third control method is arranged so as to deal with the case where access to the SIM function section 13 is attempted by the mobile phone 2 using a command other than a STATUS command while the SIM function section 13 is being accessed by the external controller 3 through wireless communication. How the third control method works will now be described below in reference to the sequence diagram of FIG. 13.

In the state of occupancy by the wireless side, the SIM function section 13 is occupied by the controller 3 with wireless access while access by the mobile phone 2 is inhibited.

Upon detection of a clock signal DEV_CLK coming from the SIM terminal section 300 in the state of occupancy by the wireless side, the conflict control section 10 reaches a wireless access interrupted state (1100).

In the wireless access interrupted state (1100), the conflict control section 10 receives a command other than the STATUS command from the mobile phone 2 via the SIM terminal section 300. Upon receipt of that command, the conflict control section 10 stores the header 40 of the command in question (1101). The conflict control section 10 sends a null sequence byte (1102) to the mobile phone 2 via the SIM terminal section 300, thereby putting off a time-out on the reception of an ACK signal on the mobile phone side (1103).

Using the file ID stored (in step 1000) during the processing sequence of FIG. 11, the conflict control section 10 then carries out SELECT and GET RESPONSE command sequences for the mobile phone 2 via the SIM function section 13. This restores the file designated by the mobile phone 2 prior to wireless access (1104).

The conflict control section 10 proceeds to send the header 40 stored in step 1101 to the mobile phone 2 via the SIM function section 13, before reaching the state of occupancy by the mobile side (1105). Thereafter, the conflict control section 10 transfers the ACK signal 41 coming from the SIM function section 13 to the mobile phone 2 via the SIM terminal section 300 and performs the mobile-side command control sequence 60.

As described, when the conflict control section 10 receives a command other than the STATUS command from the mobile phone 2 during wireless access by the controller 3, the conflict control section 10 interrupts the wireless communication with the controller 3 and proceeds to handle the access by the mobile phone 2 to the SIM function section 13. This allows the command sequence from the mobile phone 2 to continue, and prevents the mobile phone 2 from developing an error stemming from command-response inconsistencies.

Figure 14:
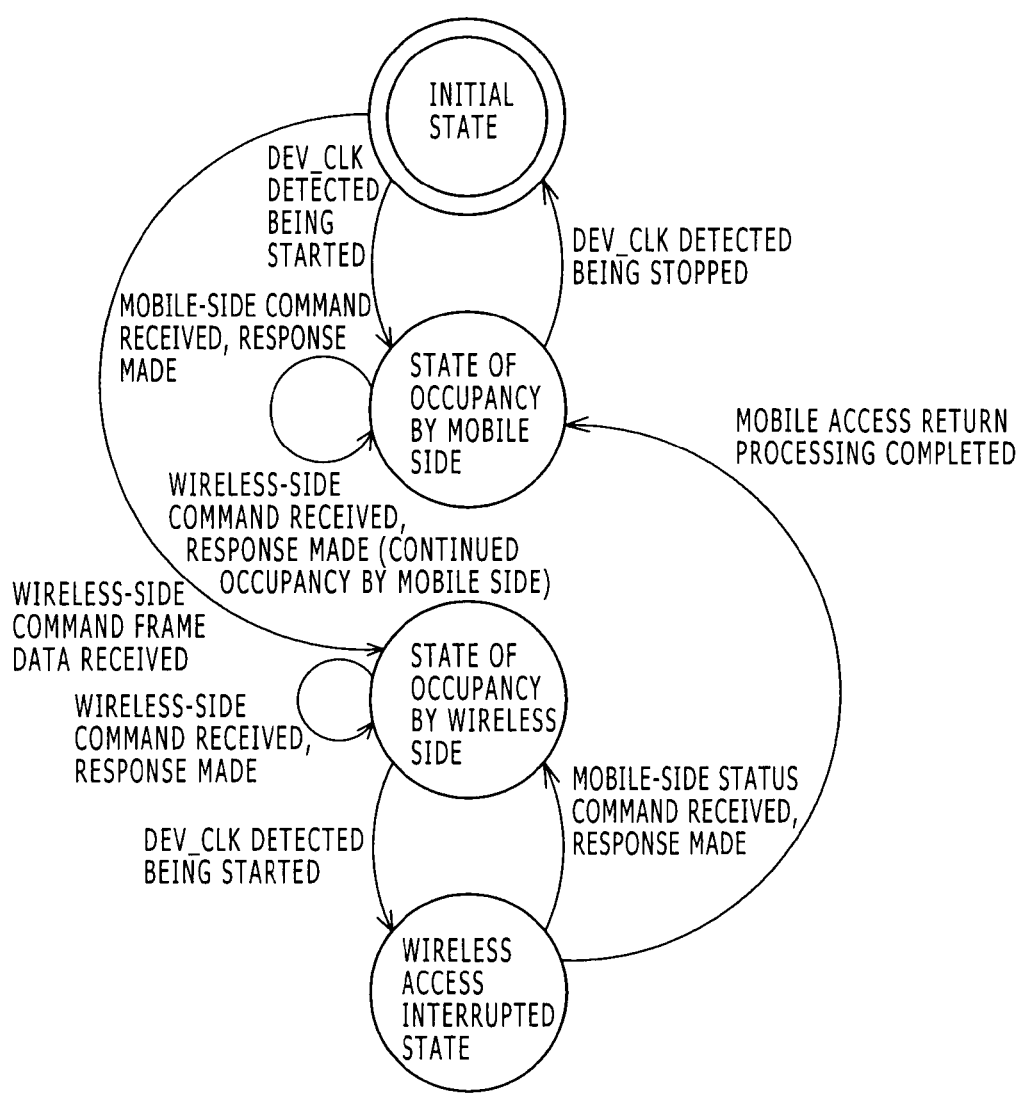
FIG. 14 is a state transition diagram of the conflict control section.

When controlling access conflict using the first through the third control methods discussed above, the conflict control section 10 makes transitions as needed among three states: the state of occupancy by the mobile side in which the mobile phone 2 monopolizes access to the SIM function section 13; the state of occupancy by the wireless side in which the controller 3 monopolizes access to the SIM function section 13; and the wireless access interrupted state in which the controller 3 has its access to the SIM function section 13 interrupted. The transitions to the different states by the conflict control section 10 are managed by the state machine inside the status management section 103 (mentioned above). FIG. 14 is a state transition diagram of the conflict control section 10. FIG. 15 is a tabular view listing the processes performed by the conflict control section 10 in each of the different states.

Figure 13:
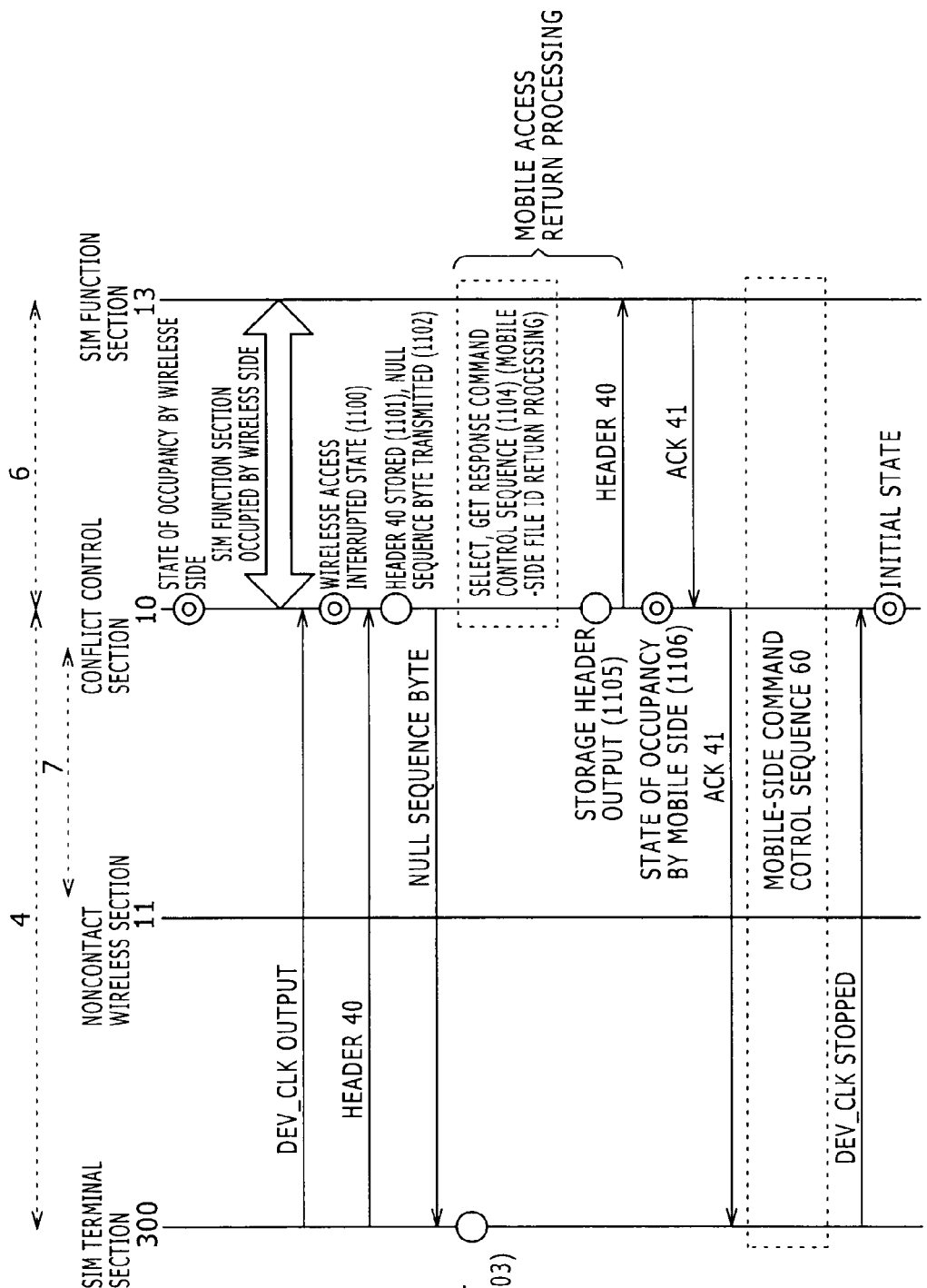
FIG. 13 is a schematic view showing the operation sequences in effect when the conflict control section using the third control method works to avoid conflict between attempts at access to the SIM function section by the mobile phone and by the controller.

In the processing sequence shown in FIG. 13, as explained above, a file ID is selected again (in step 1104) for the SIM function section 13 upon transition from the state of occupancy by the wireless side to the wireless access interrupted state, for changeover to access from the mobile phone 2. When the transition from wireless access by the controller 3 to access by the mobile phone 2 is followed by a further transition to wireless access, the file ID on the controller side needs to be selected again. Below is a description of how the file ID is selected again on the controller side.

Figure 16:
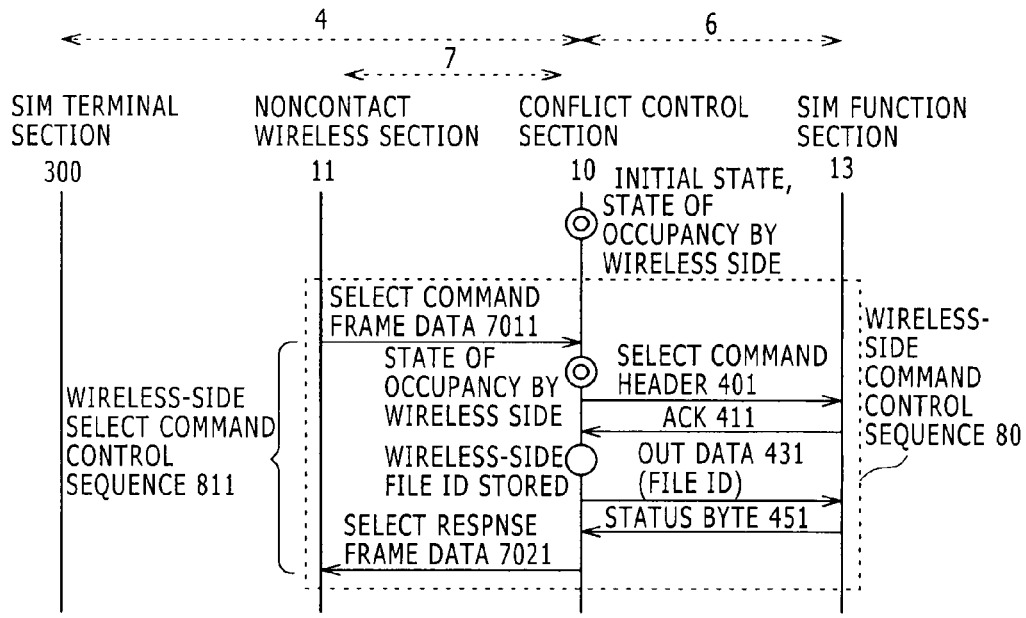
FIG. 16 is a schematic view showing the sequences in which the conflict control section stores a wireless-side file ID.

FIG. 16 schematically shows the sequences in which the conflict control section 10 stores a wireless-side file ID. If a wireless-side SELECT command control sequence 811 is carried out in the initial state or in the state of occupancy by the wireless side, then the out-data 43 attached to SELECT command frame data 7011 is stored as the wireless-side file ID.

Figure 17:
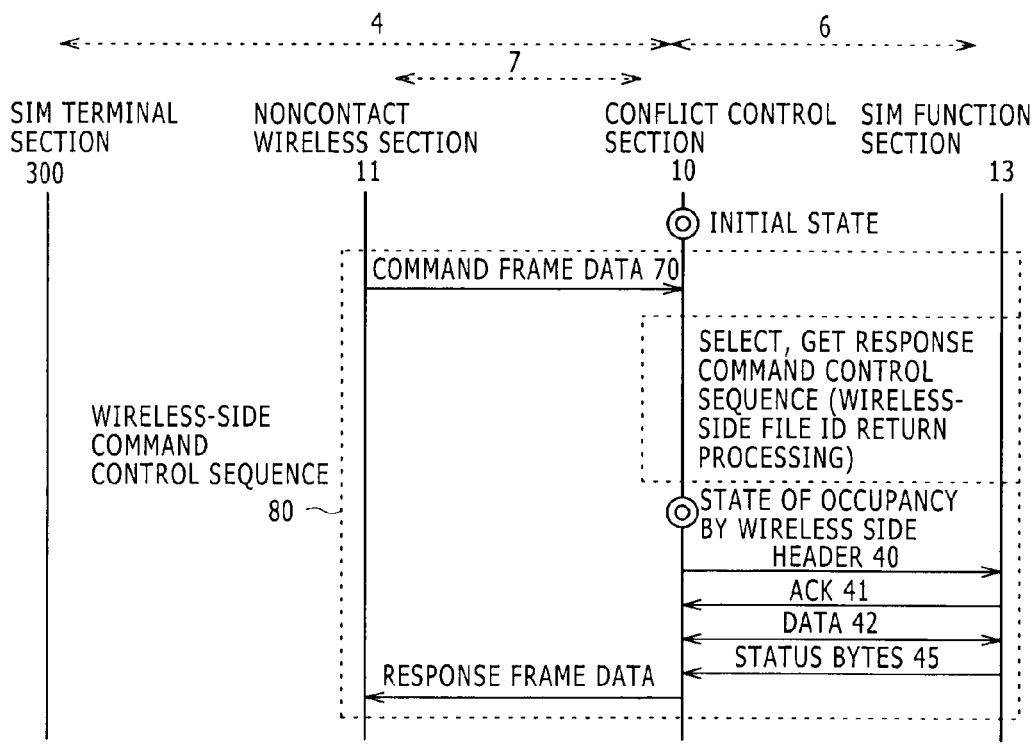
FIG. 17 is a schematic view showing the sequences in which following the transition from wireless access by the controller to access by the mobile phone, an initial state is restored by interruption of a DEV_CLK signal from the mobile phone, before wireless access is performed again by the controller.
Figure 18A:
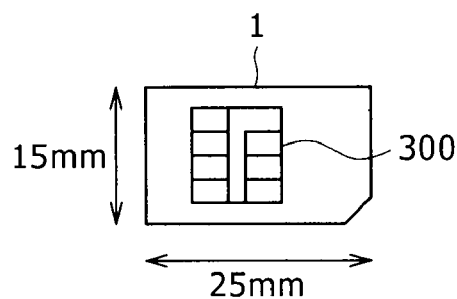
FIG. 18A is a schematic view showing a typical structure of a SIM card.
Figure 18B:
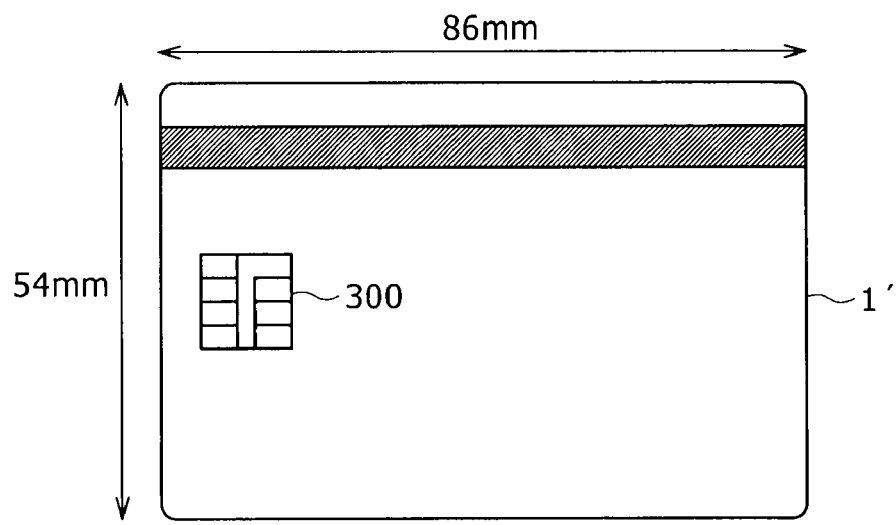
FIG. 18B is a schematic view showing a typical structure of a noncontact IC card.
Figure 19:
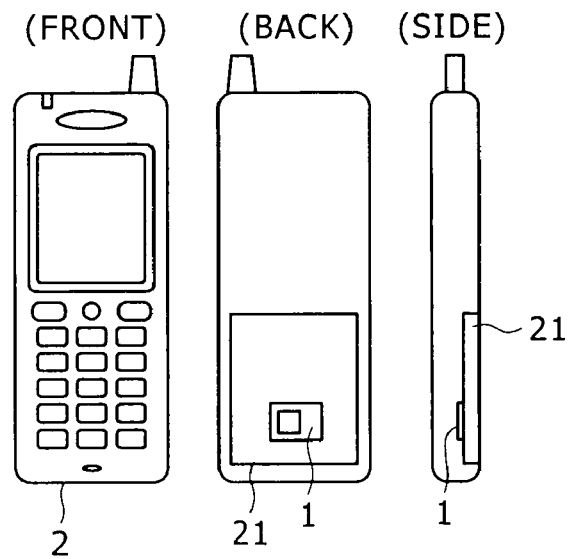
FIG. 19 is a set of views showing how a SIM card is mounted on the mobile phone.

FIG. 17 schematically shows the sequences in which, following the transition from wireless access by the controller 3 to access by the mobile phone 2, the initial state is restored by interruption of a DEV_CLK signal from the mobile phone 2, before wireless access is performed again by the controller 3.

Upon receipt of command frame data 70 in the initial state, the conflict control section 10 executes SELECT and GET RESPONSE commands on the SIM function section 13 using the wireless-side file ID stored during the processing sequence shown in FIG. 16. The conflict control section 10 then makes transition to the state of occupancy by the wireless side. Thereafter, the wireless-side command control sequence is allowed to continue.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow.

For example, although the inventive storage medium for storing the subscriber information about the mobile phone was discussed above with emphasis on the SIM card defined by GSM (11.11) and ISO/IEC 7816, this is not limitative of the present invention. This invention can be applied not only to the SIM card that is currently utilized extensively by mobile phones operating on the GSM or W-CDMA principles, but also to other diverse types of storage media which may or may not be compatible with the SIM card and which can be used to store subscriber information about mobile phones.

Thus the scope of the invention should be determined by the appended claims and their legal equivalents, rather than by the examples given.

What is claimed is:

1. A storage medium configured to connect to a mobile phone, said storage medium comprising:
   contact type connection means for connecting with said mobile phone;
   wireless communication means for connecting with a controller external to said storage medium and said mobile phone;
   subscriber information storage means for storing subscriber information about a subscriber using said mobile phone; and
   conflict control means for controlling access to said subscriber information storage means by said mobile phone through said contact type connection means, and access to said subscriber information storage means by said controller through said wireless communication means, wherein
   when a command is received from said mobile phone while said controller is accessing said subscriber information storage means via said wireless communication means, said conflict control means controls access to said subscriber information storage means by said mobile phone and said controller based on the type of the command received from said mobile phone.

2. The storage medium according to claim 1, wherein said conflict control section is configured to inhibit the access to said subscriber information storage section by said wireless communication section while a clock signal is being input to said contact type connection section from said mobile phone; and
said conflict control section is configured to send a busy response to said controller via said wireless communication section upon receipt of a command from said controller while said access is being inhibited.

3. The storage medium according to claim 1, wherein:
said contact type connection section is configured to exchange data with said mobile phone in a manner complying with ISO/IEC 7816-3;
upon detection of input of a clock signal defined by ISO/IEC 7816 from said mobile phone, said conflict control section is configured to inhibit the access to said subscriber information storage section by said wireless communication section; and
upon receipt of a command from said controller while said access is being inhibited, said conflict control section is configured to send a busy response to said controller via said wireless communication section.

4. The storage medium according to claim 1, wherein:
said conflict control section is configured to retain previously stored status information about whether a request has been made for said mobile phone by said subscriber information storage section; and
if a command is issued by said mobile phone requesting return of status information while said controller is accessing said subscriber information storage section via said wireless communication section, then said conflict control section is configured to respond to said command by sending said previously stored status information to said mobile phone.

5. The storage medium according to claim 1, wherein:
said subscriber information storage section includes the functions of a subscriber identity module (SIM) card defined by GSM (11.11) and ISO/IEC 7816;
said content control section is configured to retain previously acquired response data relative to a status command defined by GSM (11.11) upon access to said SIM card by said mobile phone; and
upon receipt of a status command header from said mobile phone during the access to said subscriber information storage section by said controller via said wireless communication section, said conflict control section is configured to send said previously acquired response data to said mobile phone.

6. The storage medium according to claim 1, wherein, if a command of a predetermined type is received from said mobile phone for access to said subscriber information storage section while said controller is accessing said subscriber information storage section through said wireless communication section, then said conflict control section is configured to retain what is contained in the received command of the predetermined type, to carry out a processing sequence to let said mobile phone execute a command control sequence continuously, to prompt said controller via said wireless communication section to terminate immediately the access to said subscriber information storage section, and to send the retained content of said received command of the predetermined type to said subscriber information storage section upon termination of the access to said subscriber information storage section by said controller.

7. The storage medium according to claim 1, wherein:
said contact type connection section is configured to exchange data with said mobile phone in a manner complying with ISO/IEC 7816-3; and
upon receipt of a header of a command other than that of a status command from said mobile phone while said controller is accessing said subscriber information storage section via said wireless communication section, said conflict control section is configured to retain header information from said command, to send periodically to said mobile phone a null sequence byte defined by ISO/IEC 7816, to request said controller via said wireless communication section to terminate the access to said subscriber information storage section, to access said subscriber information storage section using the retained header information upon termination of the access to said subscriber information storage section by said controller, and to allow said mobile phone thereafter to access said subscriber information storage section.

8. A conflict control method for controlling access by a mobile phone through contact type connection means to subscriber information storage means storing subscriber information about a subscriber using said mobile phone, and access to said subscriber information storage means by a controller through wireless communication means, said conflict control method comprising the steps of:
enabling said contact type connection means to act as a transponder and said mobile phone to act as a reader/writer;
adopting a command control sequence performed in such a manner that said mobile phone periodically issues a command to said subscriber information storage means through said contact type connection means and that said subscriber information storage means responds to said command by returning status information about the subscriber information storage means through said contact type connection means; and
avoiding conflict between said command control sequence performed via said contact type connection means and the access by said controller through said wireless communication means.

9. A conflict control method for controlling access by a mobile phone through contact type connection means to subscriber information storage means storing subscriber information about a subscriber using said mobile phone, and access to said subscriber information storage means by a controller through wireless communication means, said conflict control method comprising the steps of:
inhibiting the access to said subscriber information storage means by said wireless communication means while a clock signal is being input to said contact type connection means from said mobile phone; and
sending a busy response to said controller via said wireless communication means upon receipt of a command from said controller while said access is being inhibited.

10. A conflict control method for controlling access by a mobile phone through contact type connection means to subscriber information storage means storing subscriber information about a subscriber using said mobile phone, and access to said subscriber information storage means by a controller through wireless communication means, said conflict control method comprising the steps of:
enabling said contact type connection means to exchange data with said mobile phone in a manner complying with ISO/IEC 7816-3; and
upon detection of input of a clock signal defined by ISO/IEC 7816 from said mobile phone, inhibiting the access to said subscriber information storage means by said wireless communication means; and
upon receipt of a command from said controller while said access is being inhibited, sending a busy response to said controller via said wireless communication means.

11. A conflict control method for controlling access by a mobile phone through contact type connection means to subscriber information storage means storing subscriber information about a subscriber using said mobile phone, and access to said subscriber information storage means by a controller through wireless communication means, said conflict control method comprising the steps of:
retaining previously stored status information about whether a request has been made for said mobile phone by said subscriber information storage means; and
if a command is issued by said mobile phone requesting return of status information while said controller is accessing said subscriber information storage means via said wireless communication means, then responding to said command by sending said previously stored status information to said mobile phone.

12. A conflict control method for controlling access by a mobile phone through contact type connection means to subscriber information storage means storing subscriber information about a subscriber using said mobile phone, and access to said subscriber information storage means by a controller through a wireless communication means, said subscriber information storage means including the functions of a subscriber identity module (SIM) card defined by GSM (11.11) and ISO/IEC 7816, said conflict control method comprising the steps of:
retaining previously acquired response data relative to a status command defined by GSM (11.11) upon access to said SIM card by said mobile phone; and
upon receipt of a status command header from said mobile phone during the access to said subscriber information storage means by said controller via said wireless communication means, sending said previously acquired response data to said mobile phone.

13. A conflict control method for controlling access by a mobile phone through contact type connection means to subscriber information storage means storing subscriber information about a subscriber using said mobile phone, and access to said subscriber information storage means by a controller through wireless communication means, said conflict control method comprising the steps of:
if a command is received from said mobile phone for access to said subscriber information storage means while said controller is accessing said subscriber information storage means via wireless communication means, then retaining what is contained in the received command;
carrying out a processing sequence to let said mobile phone execute a command control sequence continuously;
prompting said controller via said wireless communication means to terminate immediately the access to said subscriber information storage means; and
sending the retained content of said received command to said subscriber information storage means upon termination of wireless communication access by said controller.

14. A conflict control method for controlling access by a mobile phone through contact type connection means to subscriber information storage means storing subscriber information about a subscriber using said mobile phone, and access to said subscriber information storage means by a controller through wireless communication means, said conflict control method comprising the steps of:
enabling said contact type connection means to exchange data with said mobile phone in a manner complying with ISO/IEC 7816-3;
upon receipt of the header of a command other than that of a status command from said mobile phone while said controller is accessing said subscriber information storage means via said wireless communication means, retaining header information from said command, sending periodically to said mobile phone a null sequence byte defined by ISO/IEC 7816;

requesting said controller via said wireless communication means to terminate the access to said subscriber information storage means;

accessing said subscriber information storage means using the retained header information upon termination of wireless communication access by said controller; and allowing said mobile phone thereafter to access said subscriber information storage means.

15. A storage medium configured to connect to a mobile phone, said storage medium comprising:

a contact type connection section configured to connect with said mobile phone;

a wireless communication section configured to connect with a controller external to said storage medium and said mobile phone;

a subscriber information storage section configured to store subscriber information about a subscriber using said mobile phone; and a conflict control section configured to control access to said subscriber information storage section by said mobile phone through said contact type connection section, and access to said subscriber information storage section by said controller through said wireless communication section, wherein when a command is received from said mobile phone while said controller is accessing said subscriber information storage section via said wireless communication section, said conflict control section is configured to control access to said subscriber information storage section by said mobile phone and said controller based on the type of the command received from the mobile phone.

16. The storage medium according to claim 15, wherein:

when a command is received from said controller while said mobile phone is accessing said subscriber information storage section via said contact type connection section, said conflict control section is configured to inhibit access by said controller to said subscriber information storage section.

17. The storage medium according to claim 15, wherein:

said contact type connection section acts as a transponder regarding and said mobile phone acts as a reader/writer;

said storage medium is configured to adopt a command control sequence performed in such a manner that said mobile phone periodically issues a command of a predetermined type to said subscriber information storage section through said contact type connection section and that said subscriber information storage section responds to said command of the predetermined type by returning status information about the subscriber information storage section through said contact type connection section; and said conflict control section is configured to avoid conflict between said command control sequence performed via said contact type connection section and the access by said controller through said wireless communication section.

* * * * *